United States Patent

Terui et al.

[11] 4,365,862
[45] Dec. 28, 1982

[54] OPTICAL SWITCH

[75] Inventors: Hiroshi Terui; Morio Kobayashi, both of Mito, Japan

[73] Assignee: Nippon Telegraph & Telephone Public Corporation, Tokyo, Japan

[21] Appl. No.: 222,650

[22] Filed: Jan. 5, 1981

[30] Foreign Application Priority Data

Jan. 18, 1980 [JP] Japan .................................. 55-3474
May 2, 1980 [JP] Japan ................................. 55-59179
Jun. 7, 1980 [JP] Japan ................................. 55-76861
Oct. 6, 1980 [JP] Japan ............................... 55-138766

[51] Int. Cl.³ .............................................. G02B 5/14
[52] U.S. Cl. ............................... 350/96.13; 350/96.10
[58] Field of Search ................. 350/96.13, 96.15, 96.1

[56] References Cited

U.S. PATENT DOCUMENTS 3,589,794  7/1971  Marcatilli ........................ 350/96.1
3,969,016  7/1976  Kaiser ............................. 350/96.15
4,004,249  1/1977  Kikuchi ........................... 350/96.12

OTHER PUBLICATIONS

Sheem et al. "Light Beam Switching and Modulation Using a Built in Dielectric Channel in LiNbO₃ Planar Waveguide Applied Optics, vol. 17, #6, 3/15/78, p. 892.

*Primary Examiner*—David K. Moore
*Attorney, Agent, or Firm*—Spencer & Kaye

[57] ABSTRACT

An optical switch comprising a substrate with a refractive index $n_1$ which is transparent with respect to a guided light beam, an optical waveguide film with a refractive index $n_2$ which is formed on the substrate, a low-refractive-index region with a refractive index $n_2'$ which is smaller by a predetermined value than the refractive index $n_2$ formed at a predetermined location in the optical waveguide film, a movable dielectric chip with a refractive index $n_4$ which is transparent with respect to the guided light beam and a relative distance of which is adjustable relative to a plane including the low-refractive-index region and a vicinal area of the optical waveguide film in the vicinity of the region, and an intermediate layer with a refractive index $n_3$ disposed between the plane and the movable dielectric chip wherein the refractive indices $n_1$, $n_2$, $n_2'$, $n_3$ and $n_4$ have a relationship of $n_2 > n_2' > n_4 > (n_1, n_3)$, and effective refractive indices of the optical waveguide film and the low-refractive-index region are varied by changing a distance between the plane and the movable dielectric chip, so that guided light beam incident to the region is deflected. With such an arrangement, a deflection angle of 20° or more is obtained, so that the optical switch is suitable for the integration of the optical switch.

19 Claims, 19 Drawing Figures

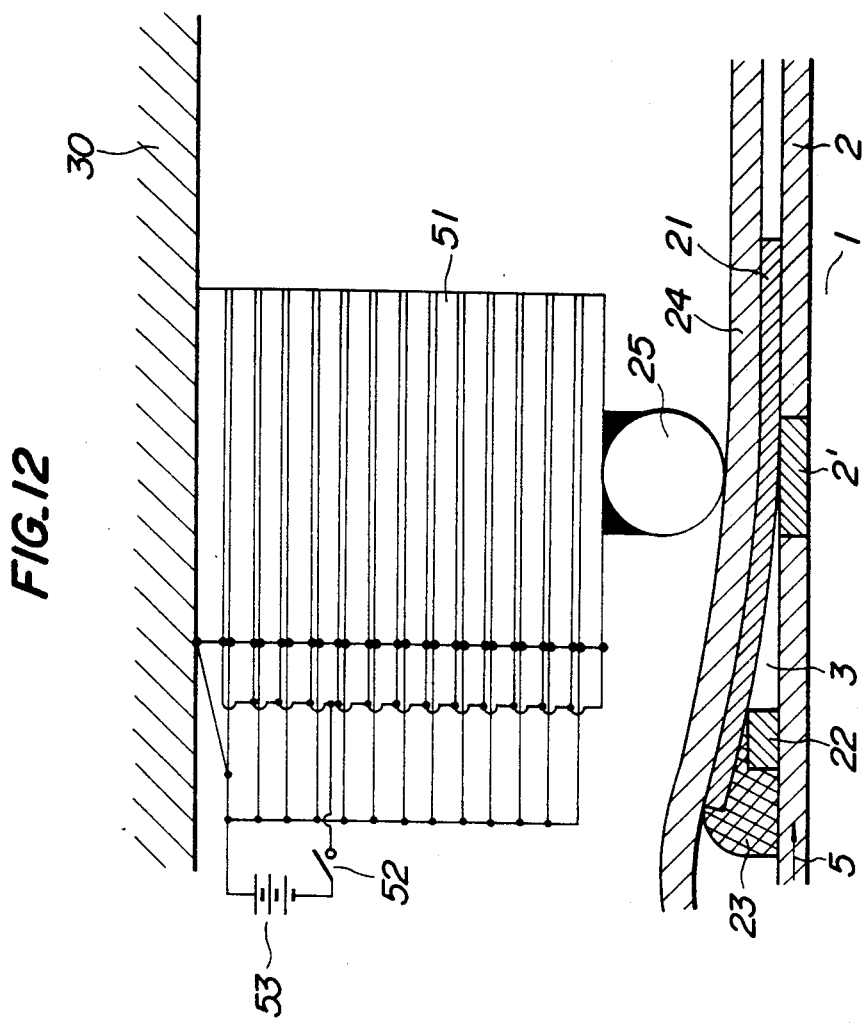

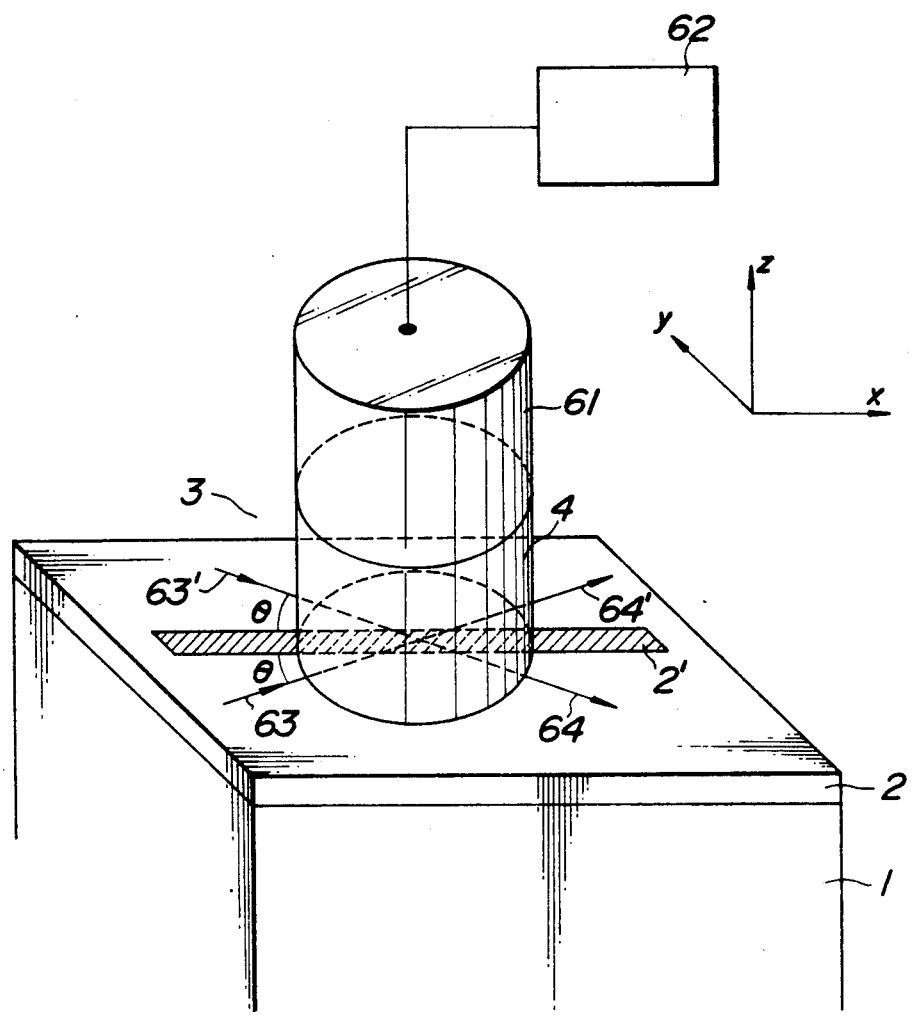

OPTICAL SWITCH

BACKGROUND OF THE INVENTION

The present invention relates to a thin film optical device for optical communication, optical data processing or the like, and more particularly to an optical switch for deflecting a light beam introduced into an optical waveguide film having a thickness substantially equal to a light wavelength so as to switch a propagating of the light beam.

Prior thin film optical switches which have thus far been proposed are of the type using an electro-optic effect or an acoustic-optic effect. Those devices deflect the guided light beam through a diffraction grating formed in an optical waveguide film by the electro-optic effect or the acoustic surface wave. More specifically, interdigital electrodes are provided on a thin film waveguide made of, for example, an electro-optic crystal $LiNb_xTa_{1-x}O_3$ in the $LiNbO_3$ system. A diffraction grating is formed by an electro-optic effect which is developed in accordance with a voltage applied to those electrodes so as to deflect the guided light beam. Alternatively, an acoustic surface wave is propagated through a $Ta_2O_5$ film as a waveguide film deposited on a piezo-electric crystal such as quartz, for example, a Y-cut α-quartz. The diffraction grating thus formed by the acoustic surface wave propagating through the waveguide film diffracts the guided light beam, so that the guided light beam is deflected. In these optical switches, one of the most important characteristics is a deflection angle of the light beam, and it is desirable that the deflection angle is large, since a very long waveguide is required to obtain a sufficient crosstalk requirement in case of a small deflection angle. A deflection angle obtained by the above-mentioned diffraction grating type optical switch is 2° or less at the most. This small deflection angle is a great problem as far as an optical switch element is integrated. In the diffraction grating type optical switch, the shorter the grating period, the larger the deflection angle. Consequently, it is necessary that an optical switching device utilizing the electro-optic effect is designed as to have interdigital electrodes with a grating period equal to that of the diffraction grating. In order to realize this interdigital electrode, an electrode pattern must be formed with a high accuracy in the order of submicron, which therefore requires highly advanced techniques for fabricating a precise electrode pattern. In the optical switching device utilizing the acoustic surface wave, it is necessary to generate a surface acoustic wave having a frequency of several hundreds MHz or more. It follows that there are needed highly sofisticated peripheral devices such as a transducer with a high efficiency for producing ultrasonic wave, a high frequency oscillator or the like. Thus, these conventional switching device of diffraction grating type has a drawback that a manufacturing cost is high in addition to the above-described disadvantage of a small deflection angle.

Another switching device was proposed by S. K. Sheem et al. in Applied Optics Vol. 17, No. 6, p. 892 (15 March 1978) "Light beam switching and modulation using a built-in dielectric channel in $LiNbO_3$ planar waveguide". In this proposal, a pair of stripe electrodes are oppositely disposed with a proper distance on a thin film waveguide of electro-optic crystal, e.g. a Ti diffused $LiNbO_3$ thin film waveguide. When a predetermined voltage is not applied across these electrodes, the guided light beam propagates straightly through a waveguide region or channel between the electrodes. When the voltage is applied across the electrodes, the electro-optic effect reduces a refractive index in the waveguide region between the electrodes to totally reflect the guided light beam so that the light beam is deflected. However, the deflection angle obtained by the switching device is 12° at most and therefore the deflection angle still involves great problems in case of the fabrication of an optical switch in the form of an optical integrating circuit.

In U.S. Pat. No. 3,589,794 entitled "Optical circuits", there is disclosed a tuning device in FIG. 19, in which a dielectric chip disposed on a waveguide is moved vertically or horizontally with respect to the waveguide to control a coupling between a figure-eight resonator disposed in the proximity of the waveguide and the waveguide. While in this U.S. Patent, reference is made to a change of the resonating frequency of the resonator by moving the dielectric chip, it does not disclose the change of a propagating direction of the light beam propagating through the waveguide and an improvement of increasing a deflection angle of the light beam.

SUMMARY OF THE INVENTION

Accordingly, a primary object of the present invention is to provide an optical switch with a satisfactory deflection angle, in which the above-mentioned problems are solved.

Another object of the present invention is to provide a thin film type optical switch with a simple construction, a low cost and a high efficiency.

Yet another object of the present invention is to provide an optical switch suitable for integration.

Still another object of the present invention is to provide an optical switch which is controlled in such a way that a deflection direction of a light beam is switched electrically.

A further object of the present invention is to provide a thin film optical switch having a plurality of inputs and a plurality of outputs.

The inventors of the present patent application disclosed an optical waveguide film formed by an $SiO_2$-$TaO_5$ film, in Applied Physics Letter 32(10), May 15, 1978, "Refractive-index-adjustable $SiO_2$-$Ta_2O_5$ films for integrated optical circuits". Further, the inventors also disclosed a new technique of fabricating a channel waveguide on an $SiO_2$-$Ta_2O_5$ film by a $CO_2$ laser, in Electronics Letters, Feb. 1, 1979, Vol. 15, 3, pp. 79–80 "Fabrication of channel optical waveguide using $CO_2$ laser". According to the technique, a great change of refractive index of 2% was successfully attained. The inventors have found a fact that a deflection angle of light beam is increased by well taking advantage of such a technique and completed the present invention on the basis of this technical recognition.

According to one aspect of the present invention, an optical switch comprises a substrate with a refractive index $n_1$ which is transparent with respect to a guided light beam, an optical waveguide film with a refractive index of $n_2$ which is formed on the substrate, a low-refractive-index region with a refractive index $n_2'$ which is smaller by a predetermined value than refractive index $n_2$ formed at a predetermined location in the optical waveguide film, a movable dielectric chip with a refractive index $n_4$ which is transparent with respect to the guided light beam and a relative distance of which is adjustable relative to a plane including the low-refractive-index region and a vicinal area of the optical waveguide film in the vicinity of the low-refractive-index region, and an intermediate layer with a refractive index $n_3$ disposed between the plane and the movable dielectric chip, wherein the refractive indices $n_1$, $n_2$, $n_2'$, $n_3$ and $n_4$ have a relationship of $n_2 > n_2' > n_4 > (n_1, n_3)$, and effective refractive indices of the optical waveguide film and the low-refractive-index region are varied by changing a distance between the plane and the movable dielectric chip, so that the guided light beam incident into the low-refractive-index region is deflected.

In the above arrangement, the movable dielectric chip may be movable in a direction vertical or horizontal with respect to the plane. The configuration of the movable dielectric chip may be cylindrical or a pointed edge may be formed at the end portion of the movable dielectric chip facing the plane. Further, the optical waveguide film may be an $SiO_2$-$Ta_2O_5$ film the substrate may be made of Vycor glass, the dielectric chip may be made of gadolinium gallium garnet (GGG), and the intermediate layer may be an air layer.

In a preferred embodiment, the movable dielectric chip is a flexible dielectric thin layer disposed above the plane via the intermediate layer, and a drive member movable in a direction vertical to the plane is disposed above the flexible dielectric thin layer, wherein effective refractive indices of the optical waveguide film and the low-refractive-index region are varied by changing a distance between the plane and the flexible dielectric thin layer by means of the drive member, so that the guided light beam incident into the low-refractive-index region is deflected.

A protecting layer is preferably deposited on a surface of the flexible dielectric thin layer facing the drive member. Further, the intermediate layer may be defined by a spacer interposed between the optical waveguide film and the flexible dielectric thin layer.

According to another aspect of the present invention, an optical switch comprises a substrate with a refractive index $n_1$ which is transparent with respect to a guided light beam, an optical waveguide film with a refractive index $n_2$ which is formed on the substrate, and at least one switching portion disposed on the waveguide film and having a low-refractive-index region with a refractive index $n_2'$ which is smaller by a predetermined value than the refractive index $n_2$ formed at a predetermined location in the optical guide film, a movable dielectric thin layer with a refractive index $n_4$ which is transparent with respect to the guided light beam and has an area sufficient to cover the low-refractive-index region and a vicinal area of the optical waveguide film in the vicinity of the low-refractive-index region, an air layer with a refractive index $n_3$ formed by fixing one end of the flexible dielectric thin layer via a spacer to a location of the optical waveguide film which is off a propagating path of the guided light beam so as to keep a predetermined distance between the flexible dielectric thin layer and the plane including the low-refractive-index region and the vicinal area, a protecting sheet covering the flexible dielectric thin layer, a pressing member disposed on the protecting sheet for pressing the protecting sheet against the flexible dielectric thin layer to change a distance between the flexible dielectric thin layer and the low-refractive-index region, and electrical control means for controlling whether the pressing member is to be pressed against the protecting sheet or not, wherein the refractive indices $n_1$, $n_2$, $n_2'$, $n_3$ and $n_4$ have a relationship of $n_2 > n_2' > n_4 > (n_1, n_3)$, and the propagating direction of the guided light beam is switched in a manner that the guided light beam incident into the switching portion propagates straight or deflected by a predetermined angle under the control of the electrical control means.

The pressing member has a pressing ball which is pressed against the protecting sheet under the control of the electrical control means, such as an electromagnet or a piezo-electric bimorph. Additionally, the low-refractive-index region in each of the switching portions may be stripe-shaped and the low-refractive-index regions may be arranged in parallel with each other.

According to yet another aspect of the present invention, there is provided an optical switch circuit which comprises a substrate with a refractive index $n_1$ which is transparent with respect to the guided light beam, an optical waveguide film with a refractive index $n_2$ which is formed on the substrate, a low-refractive-index region with a refractive index $n_2'$ which is smaller by a predetermined value than the refractive index $n_2$ and formed at a predetermined location in the optical waveguide film in which the low-refractive-index region is comprised of $(K+1)$ (where K: positive integer) stripe regions and in which, when an x-y orthogonal coordinate system is applied to the optical waveguide film, the center lines of the respective stripe regions are coincident with $(K+1)$ straight lines expressed by $y = -kd$, where $k = 0, 1, \ldots, K$ and $d$ = a distance between the center lines of the adjacent stripe regions, and the leftmost side of each of the stripe regions lies in a third quadrant of the x-y orthogonal coordinate system, a total reflection angle $\theta$ of the low-refractive-index region with respect to the guided light beam and a distance l in the direction of x axis between a first port of one stripe region and a second port of a stripe region adjacent to the one stripe region, the second port being the closet to the first port have a relationship of $l = d/\tan \theta$, and an x coordinate of each of the rightmost sides of the $(K+1)$ stripe regions being larger than $(K-1)l$, and movable dielectric chips with a refractive index $n_4$ and each having a bottom surface which is sufficient to cover the stripe region and a vicinal area of the optical waveguide film in the vicinity of the stripe region and which is in parallel with the optical waveguide film and disposed on an intermediate layer with a refractive index $n_3$ at each of $K(K-1)/2$ locations which are represented by the following coordinates of x-y orthogonal coordinate system on the low-refractive-index region;

$$[2(k_1-1)l,\ 2(k_2-1)d]$$

where, when K is an odd number, $$k_1 = 1, 2, \ldots, (K+1)/2$$

$$k_2 = 1, 2, \ldots, (K-1)/2$$

when K is an even number $$k_1 = 1, 2, \ldots, K/2$$

$$k_2 = 1, 2, \ldots, K/2, \text{ and}$$

$$[(2k_1-1)l,\ 2k_2d]$$

where, when K is an odd number, $$k_1 = 1, 2, \ldots, (K-1)/2$$

$$k_2 = 1, 2, \ldots, (K-1)/2$$

when K is an even number, $$k_1 = 1, 2, \ldots K/2$$

$$k_2 = 1, 2, \ldots, (K/2) - 1,$$

wherein relationships of $N'/N > \cos\theta > N_0'/N_0$ and $n_2 > n_2' > n_4 > (n_1, n_3)$ are satisfied, where $N_0$ and $N_0'$ are effective refractive indices of the optical waveguide film and the center of the stripe region, respectively, when a distance $l_3$ between the movable dielectric chip and the optical waveguide film is larger than the thickness of the optical waveguide film, and N and N' are effective refractive indices of the waveguide film and the center of the stripe region, respectively.

According to still another aspect of the present invention, there is provided an optical switch circuit which comprises a substrate with a refractive index $n_1$ which is transparent to the guided light beam, an optical waveguide film with a refractive index $n_2$ which is formed on the substrate, a low-refractive-index region with a refractive index $n_2'$ which is smaller by a predetermined value than the refractive index $n_2$ and formed at a predetermined location in the optical waveguide film in which the low-refractive-index region is comprised of K (where K: positive integer) stripe regions and in which, when an x-y orthogonal coordinate system is applied to the optical waveguide film, the center lines of the respective stripe regions are coincident with K straight lines expressed by $y = \pm kd$, where $k = 0, 1, \ldots, (K-1)$ and $d =$ a distance between the center lines of the adjacent stripe regions, and the leftmost side of each of the stripe regions lies in a third quadrant of the x-y orthogonal coordinate system, a total reflection angle $\theta$ of the low-refractive-index region with respect to the guided light beam and a distance l in the direction of x axis between a first port of one stripe region and a second port of a stripe region adjacent to the one stripe region, and the second port being the closest to the first port have a relationship of $l = d/\tan\theta$, and an x coordinate of each of the rightmost sides of the K stripe regions being larger than $(K-1)l$, and an x coordinate of each of the leftmost sides of the K stripe regions being smaller than $-(K-1)l$, and movable dielectric chips with a refractive index $n_4$ and each having a bottom surface which is sufficient to cover the stripe region and a vicinal area of the optical waveguide film in the vicinity of the stripe region and which is in parallel with the optical waveguide film and disposed on an intermediate layer with a refractive index $n_3$ at each of $K(K-1)/2$ locations which are represented by the following coordinates of x-y orthogonal coordinate system on the low-refractive-index region;

$$[(k_1-1)l - 2l(k_2-1), (k_1-1)d]$$

where $$k_1 = 1, 2, \ldots, (K-1)$$

$$k_2 = 1, 2, \ldots, k_1$$

wherein relationships of $N'/N > \cos\theta > N_0'/N_0$ and $n_2 > n_2' > n_4 > (n_1, n_3)$ are satisfied, where $N_0$ and $N_0'$ are effective refractive indices of the optical waveguide film and the center of the stripe region, respectively, when a distance $l_3$ between the movable dielectric chip and the optical waveguide film is larger than the thickness of the optical waveguide film, and N and N' are effective refractive indices of the waveguide film and the center of the stripe region, respectively.

BRIEF DESCRIPTION OF THE DRAWINGS

FIGS. 11 and 12 are cross sectional views showing further embodiments of an optical switch according to the present invention;

FIG. 13 is a perspective view showing an embodiment of a $2 \times 2$ optical switch element according to the present invention;

DESCRIPTION OF PREFERRED EMBODIMENT

Figure 1:
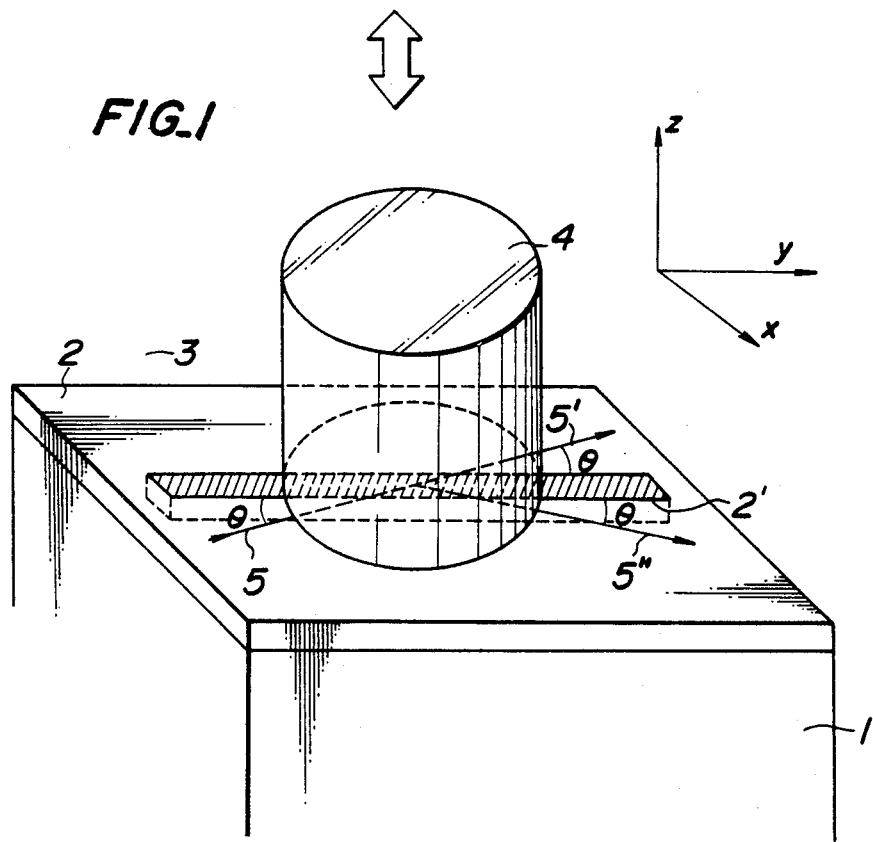
FIG. 1 is a perspective view showing an embodiment of an optical switch according to the present invention.

Reference is first made to FIG. 1 illustrating a fundamental construction of an optical switch according to the present invention. In FIG. 1, reference numeral 1 designates a smoothed substrate, for example, a Vycor substrate transparent with respect to a guided light beam. An optical guide film 2 with a thickness comparable with a wavelength of light, for example, an $SiO_2$-$Ta_2O_5$ film, is deposited on the substrate 1. For the convenience of illustration, the x-y coordinate system is applied to a plane of the optical waveguide film 2, with a z axis orthogonal to the x-y coordinates. A low-refractive-index region 2' linearly extending in the y axis direction is formed at a predetermined location of the optical waveguide film 2 by $CO_2$ laser irradiation. A dielectric chip 4 which is transparent with respect to a light 5 entering the optical waveguide film 2 and which has a bottom face in parallel with the x-y plane is disposed above the optical waveguide film 2 and the low-refractive-index region 2', with an intermediate layer, for example, an air layer 3 interposed between them. The dielectric chip 4 is movable to a direction illustrated by an arrow or the Z axis direction and is provided to change effective refractive indices in the optical waveguide film 2 and the low-refractive-index region 2' by changing a distance between a plane formed by the optical waveguide film 2 and the low-refractive-index region 2' and the dielectric chip 4. Instead of moving the dielectric chip 4 in the Z axis direction, it is evident that the distance may be changed by displacing the dielectric chip 4 relative to the substrate 1 bearing the film 2 and the region 2' in a proper x-y direction.

Figure 2:
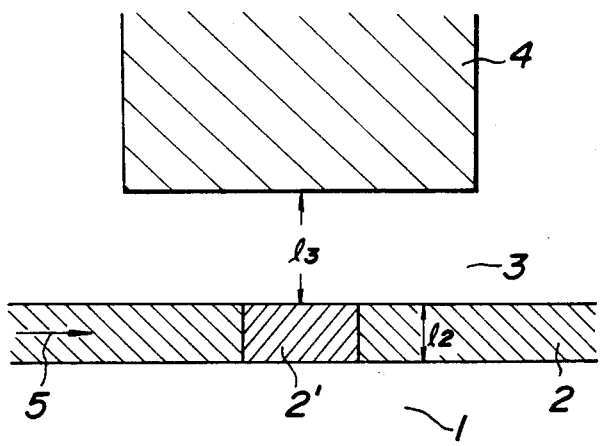
FIG. 2 is an enlarged cross sectional view showing a part of the optical switch shown in FIG. 1.

A cross section of the optical switch shown in FIG. 1 which is taken along the x-y plane is shown in FIG. 2. In FIG. 2, $l_2$ and $l_3$ are thicknesses of the optical waveguide film 2 and the intermediate layer 3, respectively. In this case, thicknesses of the substrate 1 and the movable dielectric chip 4 may be considered to be infinitive. When there is a relationship of $n_2 > n_2' > n_4 > (n_1, n_3)$, where $n_1$, $n_2$, $n_2'$ $n_3$ and $n_4$ are refractive indices of the substrate 1, the optical waveguide film 2, the low-refractive-index region 2', the intermediate layer 3 and the movable dielectric chip 4, respectively, a waveguide mode exists in the optical waveguide film 2 and the low-refractive-index region 2'. Further, the refractive index $n_2'$, when it is Gaussian distribution, as will be described, is a value obtained at the center of the region 2' in the y axis direction. When its effective refractive index is N, an eigenequation of the mode to satisfy $n_2 > n_2' > N > n_4 > (n_1, n_3)$ is given as follows.

$$a_2 l_2 = \tan^{-1}(T_{21}^2 a_1/a_2) - \tan^{-1}(T_{23}^2 \phi a_3/a_2) + m\pi \quad (1)$$

where $$a_1 = K\sqrt{N^2 - n_1^2}, \quad a_2 = K\sqrt{n_2^2 - N^2},$$

$$a_3 = K\sqrt{N^2 - n_3^2}, \quad a_4 = K\sqrt{N^2 - n_4^2}$$

$$\phi = \frac{(a_3 - T_{34}^2 a_4) - e^{2a_3 l_3 (T_{34}^2 a_4 + a_3)}}{(a_3 - T_{34}^2 a_4) + e^{2a_3 l_3 (T_{34}^2 a_4 + a_3)}}$$

$$T_{21} = \begin{cases} 1 & TE\text{ mode} \\ n_2/n_1 & TM\text{ mode} \end{cases} \quad T_{23} = \begin{cases} 1 & TE\text{ mode} \\ n_2/n_3 & TM\text{ mode} \end{cases}$$

$$T_{34} = \begin{cases} 1 & TE\text{ mode} \\ n_3/n_4 & TM\text{ mode} \end{cases} \quad K = 2\pi/\lambda$$

where $\lambda$ is the wavelength of the guided light and m is zero or a positive integer representing an order of mode.

Let us consider a case where the guided light beam 5 is incident into the low-refractive-index region 2' at an angle $\theta$, as shown in FIG. 1. When the movable dielectric chip 4 is sufficiently distant from the optical waveguide film 2 and the low-refractive-index region 2', that is, the thickness $l_3$ is large, it is assumed that an effective refractive index in the optical waveguide layer 2 with respect to the guided light beam 5 is $N_0$ and an effective refractive index in the low-refractive-index region 2' with respect to the guided light beam 5 is $N_0'$. The values of the effective refractive indices $N_0$ and $N_0'$ are obtained by substituting $n_2$ and $n_2'$ for $n_2$ in equation (1), respectively, and by $l_3 \to \infty$. When $\cos \theta < (N_0'/N_0)$, an extremely small part of the guided light beam 5 is reflected by the low-refractive-index region 2', but most of the guided light beam transmits through the region 2' and is derived therefrom as a transmitted light beam 5'. When $\cos \theta > (N_0'/N_0)$, the guided light beam 5 is totally reflected into a deflected light beam 5'' in the low refractive index region 2'. The deflection angle at this time is $2\theta$, as seen from FIG. 1.

Under this condition, if the movable dielectric chip 4 is made to approach to the optical waveguide layer 2 and the low-refractive-index region 2', in other words, if the thickness $l_3$ is shortened, the effective refractive indices of both of the optical waveguide film 2 and the low-refractive-index region 2' increase, because of $n_4 > n_3$. An increasing rate of the effective refractive index of the region 2' is larger than that of the film 2, as seen from equation (1). If the effective refractive indices of the optical waveguide film 2 and the low-refractive-index region 2' are N and N', respectively, when the movable dielectric chip 4 is made close to the waveguide film 2 and the region 2', the following relation exists.

$$N'/N > N_0'/N_0.$$

Hence, if an incident angle $\theta$ is so selected as to satisfy $$(N'/N) > \cos \theta > (N_0'/N_0) \quad (2),$$

the following result is obtained. That is to say, when the movable dielectric chip 4 is close to the film 2 and the region 2', the condition of total internal reflection is not satisfied and therefore the guided light beam 5 transmits through the low-refractive-index region 2' and is derived therefrom as the transmitted light beam 5'. Conversely, when the dielectric chip 4 is remote from the film 2 and the region 2', the condition of total reflection is satisfied, so that the guided light beam becomes the deflected light beam 5''. In this way, by moving the dielectric chip 4 in the z axis direction, as indicated by the arrow in FIG. 1, the guided light beam 5 becomes the transmitted light beam 5' or the deflected light beam 5'', so that the guided light beam 5 can be deflected.

As described above, the deflection angle in the present invention is $2\theta$ and becomes larger as $N_0'/N_0$ becomes smaller, as seen from equation (2). This fact indicates that the smaller the ratio of the refractive index $n_2'$ is the low-refractive-index region 2' to the refractive index $n_2$ of the waveguide film 2, the larger the deflection angle $2\theta$. According to the present invention, it is possible to decrease the ratio of $n_2'/n_2$ sufficiently, as will be clear from examples of the present invention.

A specific example of an optical switch of the present invention shown in FIG. 1 will be described. A Vycor glass (refractive index $n_1 = 1.457$) was used for the substrate 1. For the preparation of the optical waveguide film 2, use was made of a sputtering target composed of a mixture of $SiO_2$ and $Ta_2O_5$ powders at a ratio of $SiO_2$ 25 mol %-$Ta_2O_5$ 75 mol %. A film (refractive index $n_2 = 2.056$) having the above-described ratio of the constituents was deposited on the substrate 1 with a thickness $l_2 = 0.8$ μm by a conventional R-F sputtering method to form the optical waveguide film 2. Subsequently, a $CO_2$ gas laser was used as a heat source, and irradiated the optical waveguide film 2 with a Gaussian light intensity distribution, while a relative motion was made between the laser beam and the optical waveguide film 2 so as to form the low-refractive-index region 2', as shown in FIG. 1, with a width of 300 μm. By properly controlling the irradiation power of the $CO_2$ gas laser beam, the refractive index $n_2'$ of the region 2' was set at 2.015. In this case, a refractive index distribution of the region 2' in the y axis direction was the Gaussian distribution in accordance with the light intensity distribution of the laser beam. Alternatively, the refractive index distribution may be of step type. The guided light beam 5 having a wave length λ of 0.6328 μm was incident into the low-refractive-index region 2'. The dielectric chip 4 in the form of high-refractive-index glass ($n_4 = 1.975$) was disposed above the film 2 and the region 2' via the air layer 3 ($n_3 = 1.0$). As described above, the total reflection critical angle $\theta_c$ is given by $\theta_c = \cos^{-1}(N'/N)$. A variation of the total reflection critical angle $\theta_c$ was measured when the movable dielectric chip 4 is moved relative to the film 2 and the region 2', from $l_3 = 3$ μm to $l_3 = 0$ (where the dielectric chip 4 contacts the film 2 and the region 2'). The result of this measurement is graphically illustrated in FIG. 3 and mathematically expressed by $$\Delta\theta_c = \cos^{-1}(N_0'/N_0) - \cos^{-1}(N'/N) \quad (3).$$

Figure 3:
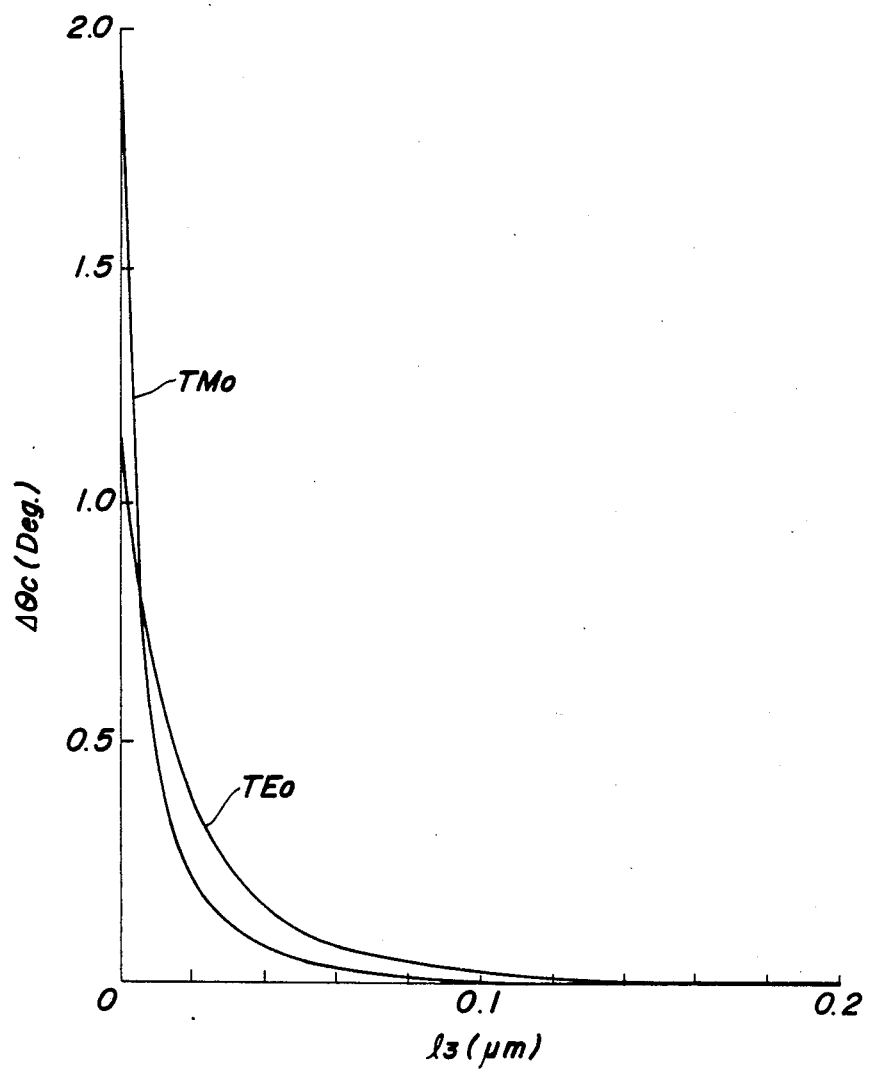
FIG. 3 is a graph illustrating a relationship between a thickness $l_3$ of the intermediate layer in the embodiment of the optical switch according to the present invention and a total reflection critical angle change $\Delta\theta c$.

Here, use was made of $TE_0$ and $TM_0$ modes in this measurement. When $l_3 = 3$ μm, the total reflection critical angle $\theta_c$ was 11.32° in $TE_0$ mode and 11.27° in $TM_0$ mode, according to equation (1). With the decrease of the distance $l_3$ from 3 μm, $\theta_c$ starts changing its value at about 1,000 Å, as seen in FIG. 3. When $l_3 = 0$, the angle $\theta_c$ was decreased by 1.16° in $TE_0$ mode and 1.89° in $TM_0$ mode. It follows that, in $TE_0$ mode, the guided light beam 5 incident to the optical waveguide film 2 at an angle θ within a range of $10.16° < \theta < 11.32°$ may be deflected by moving the movable dielectric chip 4. In $TM_0$ mode, the incident angle θ should be within a range of $9.38° < \theta < 11.27°$. The deflection angle 2θ ranges for both modes from 20.32° to 22.64° in $TE_0$ mode and from 18.76° to 22.54° in $TM_0$ mode. The extinction ratios of the deflected light beam 5'' and the transmitted light beam 5' were 16 dB and 12 dB, respectively, in $TE_0$ mode. $TM_0$ mode had similar values for the respective extinction ratios.

Figure 4:
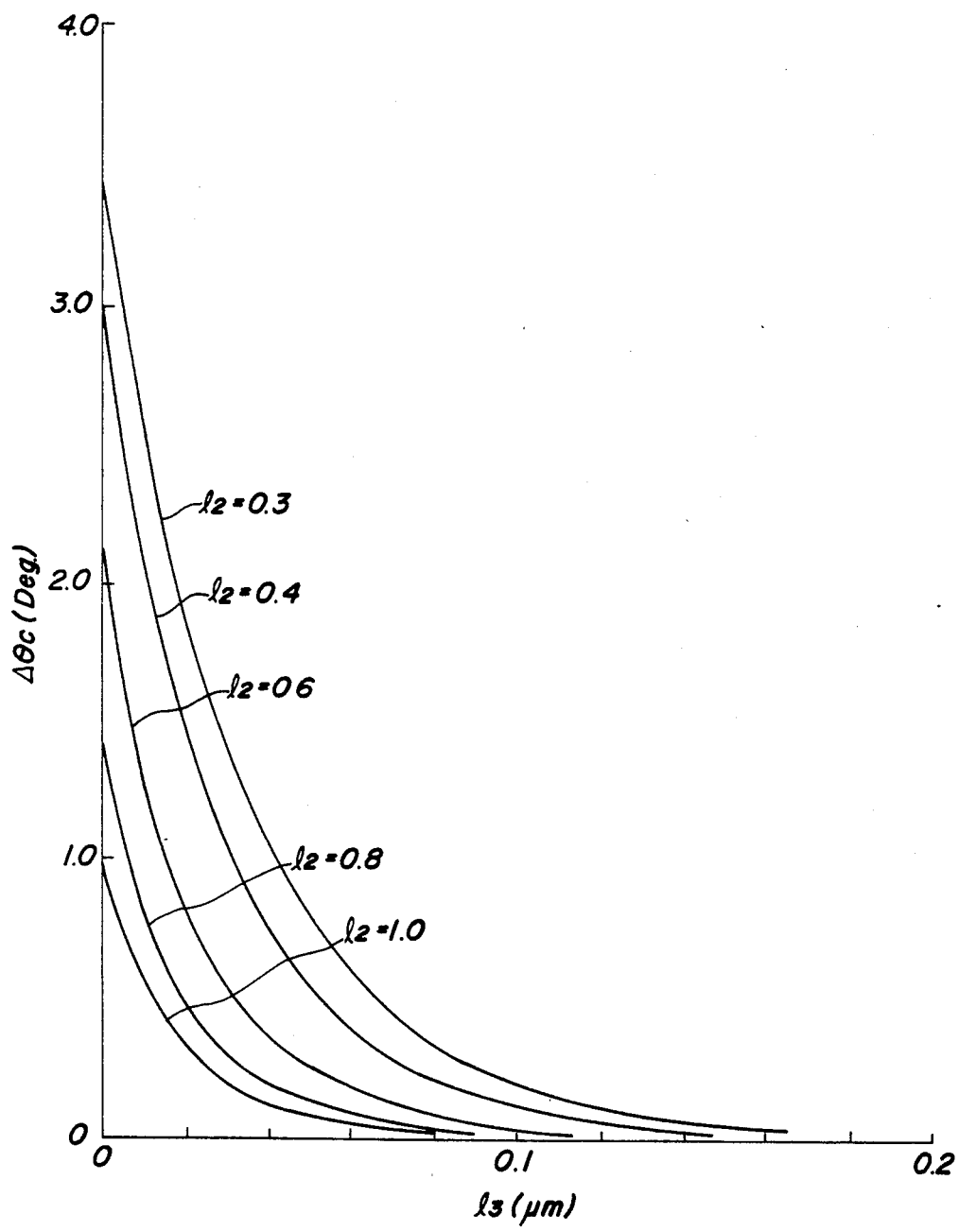
FIG. 4 is a graph illustrating characteristic curves of a relationship between a thickness $l_3$ of the intermediate layer and the total reflection critical angle change $\Delta\theta c$, with a parameter of a thickness $l_2$ of the optical waveguide film.

When the movable dielectric chip 4 is moved from a location $l_3 = 3$ μm toward the optical waveguide film 2, a relationship between the distance $l_3$ and the total reflection critical angle change $\Delta\theta_c$ of the low-refractive-index region 2' was measured and plotted as shown in FIG. 4 in $TE_0$ mode. As seen from the graph in FIG. 4, if the displacement of the dielectric chip 4 is 0.2 μm at most, the optical switching function is obtained.

Figure 5:
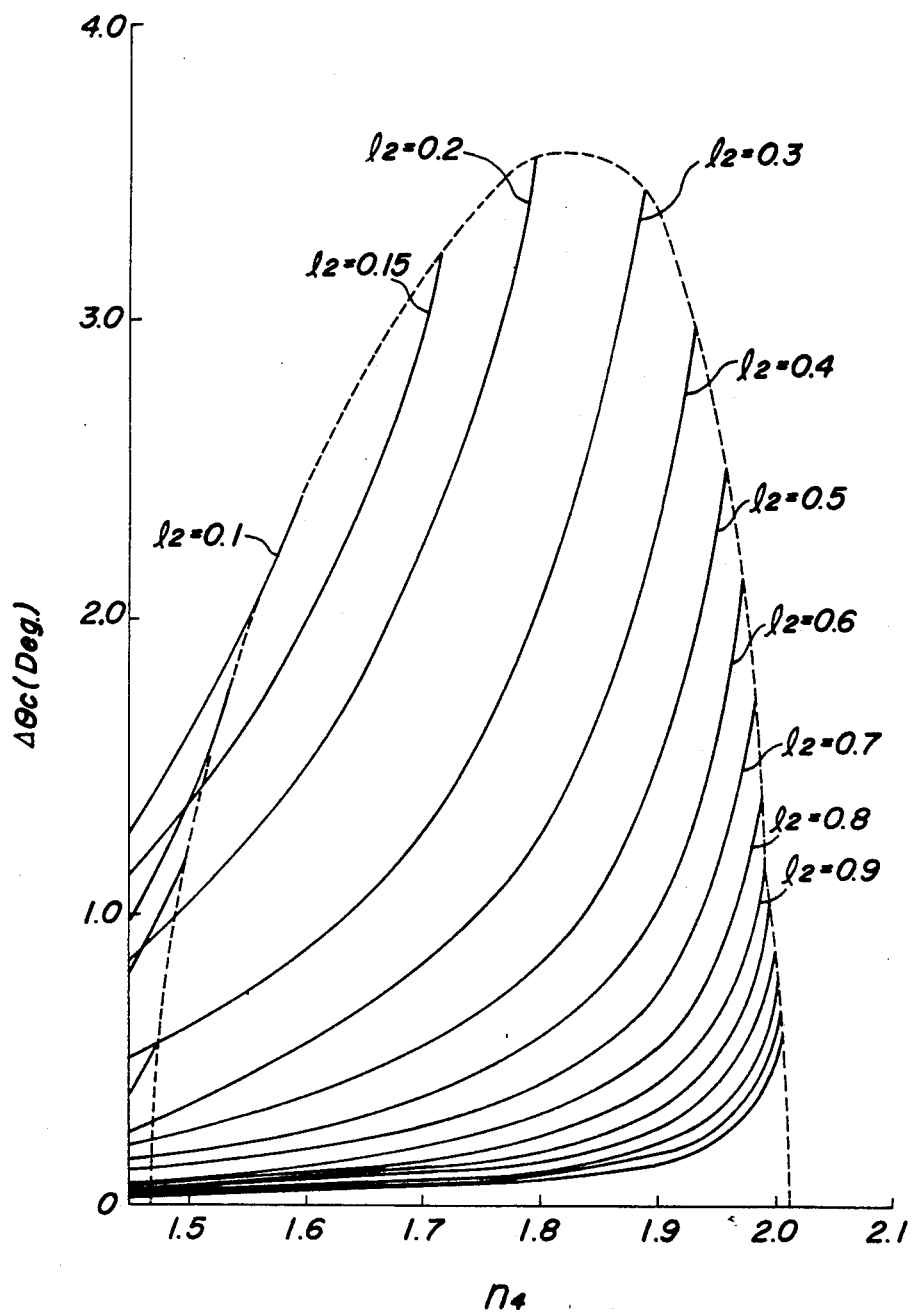
FIG. 5 is a graph illustrating characteristic curves of a relationship between a refractive index $n_4$ of a dielectric member and a total reflection critical angle change $\Delta\theta c$, with a parameter of a thickness $l_2$ of the optical waveguide film.

A graph in FIG. 5 represents a relationship of a total reflection critical angle change $\Delta\theta_c$ with the refractive index $n_4$ of the dielectric chip 4, with a parameter of a thickness of the waveguide film 2, when the dielectric chip 4 is displaced from $l_3 = 3$ μm to $l_3 = 0$. As shown in this graph, $\Delta\theta_c$ increases with the increase of $n_4$ to have the maximum value at a specific value of $n_4$. Beyond the specific value of $n_4$, $\Delta\theta_c$ is cut off. All of the waveguide films used showed this feature commonly. If a thickness of the film 2 is 0.5 μm or less, $\Delta\theta_c$ is 2° or more; however, the light beam is leaked toward the dielectric chip 4, resulting in an increase of the insertion loss. If a thickness is 1.0 μm or more, $\Delta\theta_c$ is 1° or less, so that the extinction ratio is reduced and accordingly the switching function is degraded. As a consequence, a preferable thickness of the optical waveguide film 2 ranges from 0.6 μm to 1 μm.

In case of the cylindrical dielectric chip 4 shown in FIG. 1, if the dielectric chip 4 was moved by a screwing means, load pressure necessary for the movement was 160 g. When the lower edge of the dielectric chip 4 is pointed sharply, the load pressure was reduced to 1 g or less. The latter case, however, had a drawback that a beam configuration of the switch output light was deformed.

Figure 6:
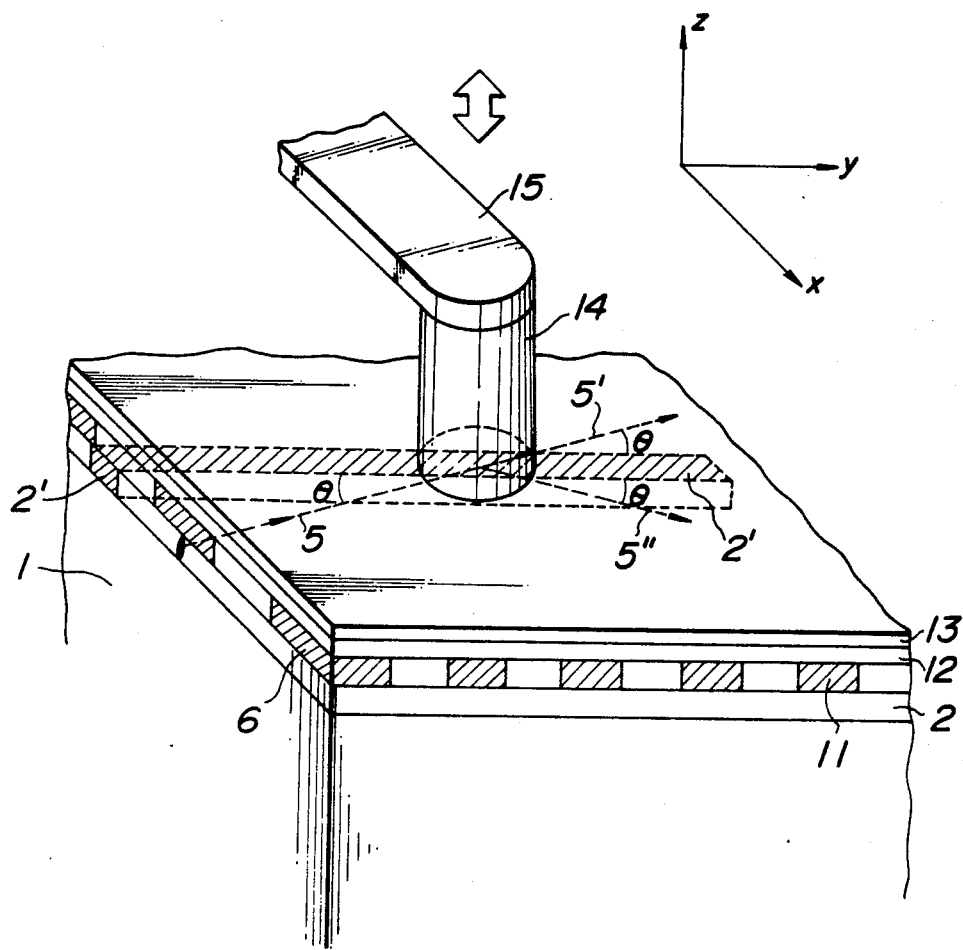
FIG. 6 is a perspective view showing another embodiment of an optical switch according to the present invention.

Turning now to FIG. 6, there is shown a second embodiment of an optical switch according to the present invention. The same reference numerals are used in FIG. 6 to designate like or effective portions in FIG. 1, for simplicity. In this embodiment, spacers 11 with a proper thickness, for example, photoresist thin layers, are disposed on the optical waveguide film 2 at locations allowing a smooth propagation of the guided light beam 5 in the waveguide film 2. By the spacers 11, a flexible dielectric thin film 12 which is transparent with respect to the guided light beam 5 is fixed onto the waveguide film 2. As a result, the intermediate layer 3, or the air layer 3 in the present embodiment, which is determined by the height of the spacers 11, is formed between the optical waveguide film 2 and the low-refractive-index region 2', and the dielectric thin film 12. The upper surface of the dielectric thin film 12 is covered with a protecting film 13 made of epoxy, silicon resin or the like. A pressure pad 14 is disposed above the protecting layer 13 and is movable in a direction, as indicated by an arrow, vertical to the respective surfaces of the optical waveguide layer 2 and the dielectric thin film 12, i.e. in the z direction, in response to a movement of a lever 15. Incidentally, the protecting layer 13 is for preventing the dielectric thin film 12 from being damaged due to the direct contact of the film 12 with the pressure pad 14.

Figure 7:
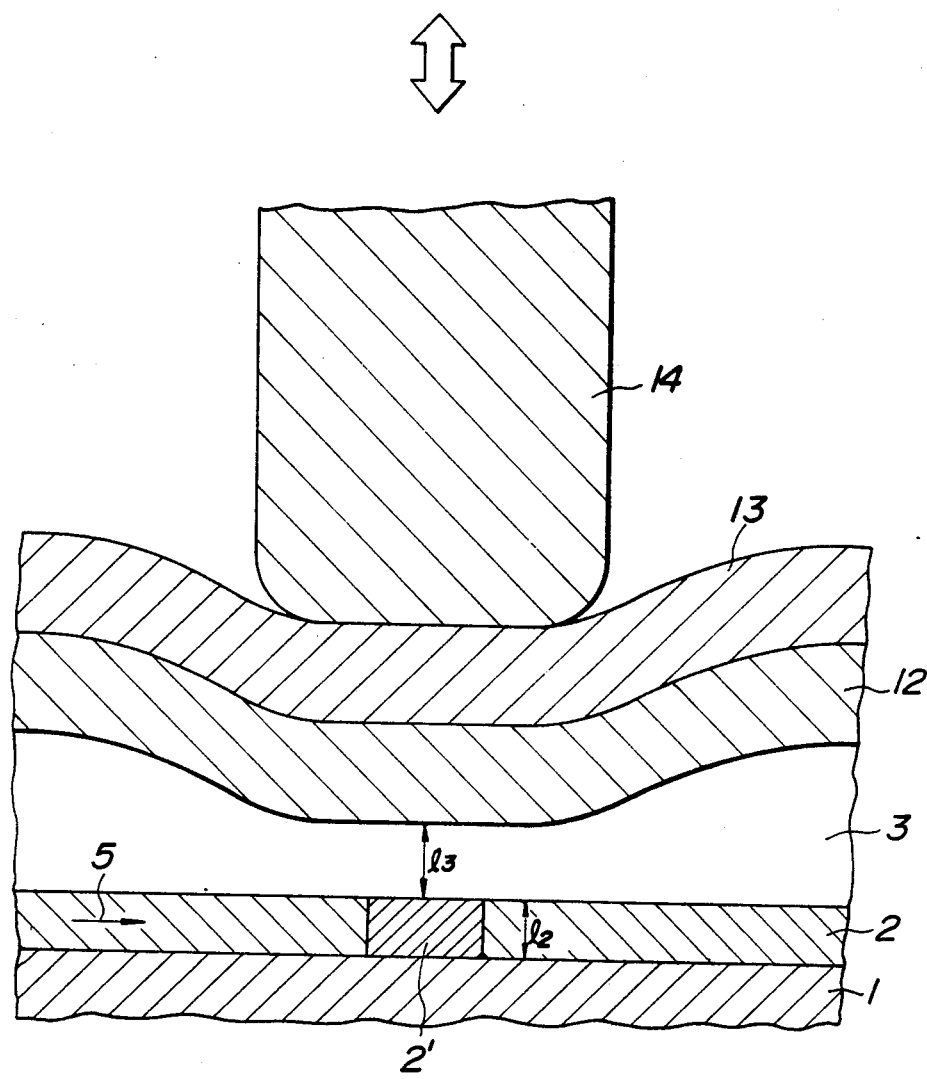
FIG. 7 is an enlarged cross sectional view showing a part of the optical switch shown in FIG. 6.

An enlarged cross section of the optical switch shown FIG. 6 taken along an x-z plane is illustrated in FIG. 7. In FIG. 7, $l_2$ and $l_3$ are thicknesses of the optical waveguide film 2 and the intermediate layer 3, respectively. The thicknesses of the substrate 1 and the flexible dielectric film 12 are sufficiently larger than the wave length of the guided light beam 5 and the thickness $l_2$ of the optical waveguide film 2, and may be considered infinitive. When the pressure pad 14 is depressed by the action of the layer 15 in a condition that the thickness $l_3$ is kept at a value sufficiently larger than the wave length λ by the spacer 11, the flexible dielectric thin film 12 is locally bent at a portion where the flexible dielectric thin film 12 is depressed toward the film 2 and the region 2' so as to shorten the distance $l_3$, as shown in FIG. 7. By moving the pressure pad 14 in the z axis direction or the direction of the arrow in FIG. 6 in this way, the guided light beam 5 is transformed into the transmitted light beam 5' or the deflected light beam 5''. As a result, the propagating direction of the guided light beam 5 is switched by an angle 2θ.

A specific embodiment of the optical switch shown in FIG. 6 will further be explained. The process of fabricating the optical waveguide film 2 and the low-refractive-index region 2' was exactly the same as that of the above-mentioned embodiment. Spacers 11 were formed by depositing a photoresist, for example, on the optical waveguide film 2 with the thickness of 3 μm. Specifically, use was made of a patterned photoresist portion obtained by developing a photoresist exposed to such a pattern as to avoid the optical paths of the guided light beam 5, the transmitted light beam 5' and the deflected light beam 5". A high refractive index ($n_4 = 1.975$) glass thin layer of 50 μm in thickness was bonded as the dielectric thin film 12 to the spacers 11 by proper adhesive. The dielectric thin film 12 was coated with the protecting layer 13 made of epoxy or silicon resin with a thickness of 50 μm. Like in the above-mentioned embodiment, the present embodiment could obtain the deflection angle of $2\theta$, i.e., from 20.32° to 22.64° in $TE_0$ mode and from 18.76° to 22.54° in $TM_0$ mode.

In the embodiment shown in FIG. 1, there is the possibility that the dielectric chip 4 directly contacts the waveguide film 2. As a consequence, if the dielectric chip 4 slips laterally on the waveguide film 2, the waveguide film 2 is likely to be scarred with the dielectric chip 4. On the other hand, in the embodiment of FIG. 6, the distance $l_3$ of the intermediate layer 3 is determined by the waveguide film 2 and the dielectric thin layer 12, so that the waveguide film 2 is not damaged even if the dielectric thin layer 12 contacts the waveguide film 2. In other words, there is no sliding movement caused between the films 2 and 12, unlike the embodiment shown in FIG. 1.

The embodiments of the present invention so far described employ manual operation for moving the dielectric chip 4 and the pressure pad 14. Such an arrangement is not suitable for an optical integrated circuit. An embodiment of the invention to solve the problem will be described with reference to FIG. 8, in which the space between the dielectric chip and the waveguide film is electrically controlled. The present embodiment utilizes a flexibility of the movable dielectric chip and a variation of the dielectric chip is controlled by an electric pressure mechanism, in such a way that the distance between the optical waveguide film and the dielectric chip is changed to switch the propagating direction of the incident guided light beam.

Figure 8:
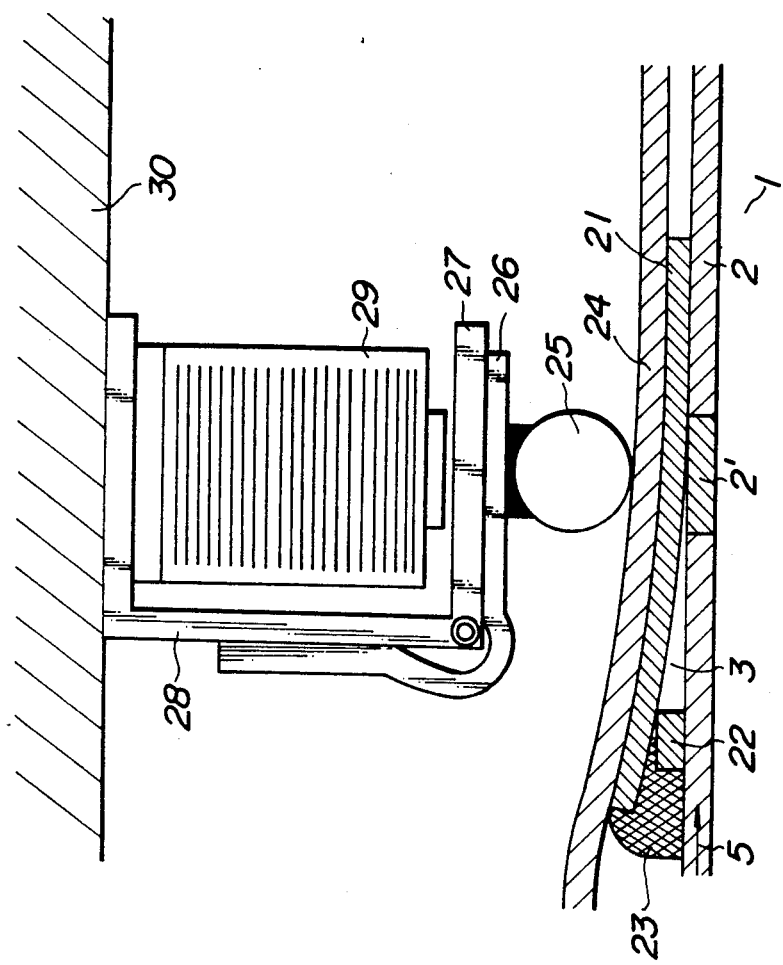
FIG. 8 is a cross sectional view of yet another embodiment of an optical switch according to the present invention.

In FIG. 8, the same reference numerals designate like or equivalent portions in FIG. 1 for simplicity of explanation. The waveguide film 2 of the refractive index $n_2$ is deposited on the substrate 1 of the refractive index $n_1$. The low-refractive-index region 2' of the refractive index $n_2'$ ($n_2 > n_2'$) is formed in the waveguide film 2. A flexible dielectric thin layer 21 which is transparent with respect to the guided light beam 5 is formed above the region 2' with the interposition of the air layer 3 between the dielectric thin layer 21 and the region 2'. The flexible dielectric thin layer 21 is fixed by adhesive 23 to predetermined locations of the optical waveguide film 2 other than the propagating path of the guided light beam 5, with the spacer 22 interposed between the layer 21 and the film 2, as shown in FIG. 8, so that the layer 21 is prevented from moving in the direction of the surface of the waveguide film 2. A flexible protecting sheet 24 covers portions where the dielectric thin layer 21 is provided in order to buffer mechanical impact upon the dielectric thin layer 21 when pressure is applied thereto and to prevent dust from entering the air layer 3. A pressure ball 25 fixed to a pressure spring 26 is disposed above the flexible dielectric thin layer 21 in contact with the upper surface of the protecting sheet 24. The pressure ball 25 is used for reducing the pressure force. The spring 26 has one leg contacting an iron lever 27 and another leg fixed to a frame 28. The iron lever 27 is swingably attached at one end to the lower end of the frame 28. An electromagnet 29 is fixed to the frame 28 so that the iron lever 27 is attracted to the electromagnet 29. The frame 28 is further fixed to an electromagnet fixing member 30. When no current is fed to the electromagnet 29 fixed to the electromagnet fixing member 30, the flexible dielectric thin film 21 is pressed downwardly in FIG. 8 by the pressure spring 26 and the ball 27 to be bent and pressed against the low-refractive-index region 2' and a vicinal area of the waveguide film 2 in the vicinity of the region 2'. When current is fed to the electromagnet 29, the iron lever 27 is attracted and the flexible dielectric thin layer 21 restores upwardly because of its resiliency to form a gap between the low-refractive-index region 2' and the vicinal area of the waveguide film 2 and the dielectric thin plate 21.

The distance of the gap between the flexible dielectric thin layer 21 and the low-refractive-index region 2' and the vicinal area may be controlled by the electromagnet 29. The propagating direction of the guided light beam 5 in the optical waveguide film 2 may be switched to the direction of the transmitted light beam or the direction of the deflected light beam by controlling the distance of the gap. Specifically, if the incident angle $\theta$ of the waveguided light beam 5 with respect to the low-refractive-index region 2' is selected so as to satisfy equation (2), the total reflection condition of the guided light beam 5 is not satisfied at the time that the movable dielectric chip 21 is made close to the film 2 and the region 2', so that the guided light beam transmits through the low-refractive-index region 2' and the transmitted light beam is derived therefrom. When the dielectric chip 21 is remote from the region 2', the total reflection condition is satisfied and the deflected light beam is derived from the region 2'. In this way, by moving the dielectric chip 21 vertically in FIG. 8 by the electromagnet 29, the guided light beam 5 is transformed into the transmitted light beam or the deflected light beam, resulting in optical switching of the propagation direction of the guided light beam.

The explanation to follow is a specific example of the optical switch of the present invention shown in FIG. 8. Here, a Vycor glass (refractive index $n_1 = 1.457$) was used for the substrate 1. For the preparation of the optical waveguide film 2, use was made of a sputtering target composed of a mixture of $SiO_2$ and $Ta_2O_5$ powders at a ratio of $SiO_2$ 25 mol %-$Ta_2O_5$ 75 mol %, as described in the foregoing. A film (refractive index $n_2 = 2.056$) having the above-described ratio of the constituents was deposited on the substrate 1 with a thickness $l_2 = 0.72$ μm by a conventional R-F sputtering method to form the optical waveguide film 2. Subsequently, a $CO_2$ gas laser was used as a heat source, and irradiated the optical waveguide film 2, as described in the foregoing, to form the low-refractive-index region 2' having a width of 300 μm and a refractive index $n_2' = 2.015$. A dielectric thin layer 21 of a GGG (gadolinium gallium garnet) crystal with a thickness of 60 μm and the refractive index $n_4 = 1.980$ was provided above the low-refractive-index region 2' and the vicinal area of the waveguide film 2, via the interposed air layer 3 with the refractive index $n_3 = 1.0$. The dielectric thin layer 21 was fixed by the adhesive 23 to the locations other than the propagating path of the guided light beam 5 on the optical waveguide layer 2, via a plastic sheet 22 having a thickness of 50 μm. For protecting the GGG thin film 21, the flexible protecting plastic sheet 24 having a thickness of 50 μm was coated over the GGG thin film 21. The steel ball 25 having a diameter of 1 mm was fixed to the spring 26 such that the GGG thin film 21 was depressible through the protecting plastic sheet 24 by the steel ball 25. With this material and structure, a pressure force necessary for the optical switching operation was 25 g. The pressure of such an magnitude was easily obtained by using a miniature type electromagnetic operable, for example, with a low power of 6 V and 0.06 A.

In the present embodiment of FIG. 8, the pressure force is sufficiently small and the dielectric chip is flexible, so that the waveguide film is not damaged. The protecting sheet 24 prevents dust in an atmosphere from entering the switching section. The locations at which the pressure is applied by the pressure ball 25 can be selected with a high degree of freedom, so that the electromagnets are easily arranged.

Figure 9:
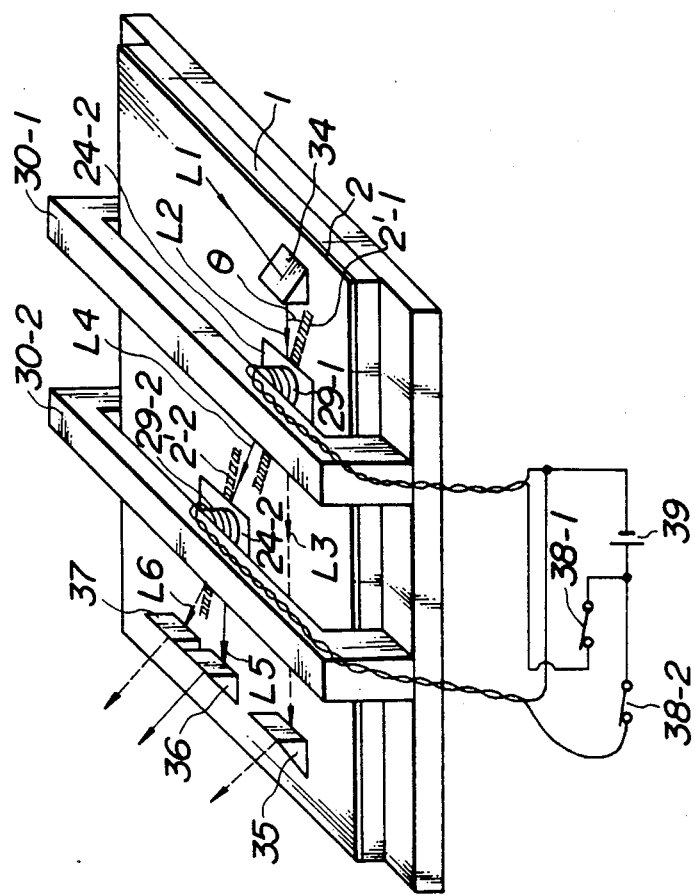
FIG. 9 is a perspective view showing an embodiment of a $1 \times 3$ switch array using the optical switch elements shown in FIG. 8.

An embodiment of a 1×3 switch array using the optical switches shown in FIG. 8 is shown in FIG. 9. In this embodiment, a pair of the low-refractive-index regions 2'-1 and 2'-2 stripe-shaped and arranged in parallel with each other with a distance of 2.5 mm, for example, were formed on the optical waveguide film 2. A light is incident into the waveguide film 2 at an incident angle θ through an incident prism 34 in the form of a rutile prism. Here, "-1" and "-2" are affixed to the reference numerals designating the parts of the switch section shown in FIG. 8. Further, the same reference numerals as in FIG. 1 are used to designate corresponding portions in FIG. 8. An incident light beam $L_1$ is incident to the incident prism 34 and a light beam $L_2$ emanating from the incident prism 34 is led to pass through the low-refractive-index region 2'-1 in a first switch section. A transmitted light beam $L_3$ propagates in a direction as indicated by a dotted line, while a deflected light beam $L_4$ travels in a direction as indicated by a solid line. In the present embodiment, a second switch section including the low-refractive-index region 2'-2 is disposed in the optical path of the deflected light beam $L_4$. The transmitted light beam $L_3$ from the first switch section is incident to an output prism 35 in the form of a rutile prism. A deflected light beam $L_5$ emitted from the second switch section, as indicated by a solid line, is incident to an output prism 36 in the form of a rutile prism. A transmitted light beam $L_6$ emanated from the second switch section, as indicated by a dotted line, is incident to an output prism 37 in the form of a rutile prism. Electric power is supplied from a power source 39 to electromagnets 38-1 and 38-2 through switches 38-1 and 38-2, respectively. In this way, the incident guided light beam passes through the two switch sections to any one of the output prisms 35 to 37 and is emitted to the outside of the optical waveguide film 2.

In the illustrated condition of the switch array in FIG. 9, both of the switches 38-1 and 38-2 are closed so that the power is supplied to both of the first and second electromagnets 29-1 and 29-2. Accordingly, the guided light beam $L_2$ is reflected two times in the low-refractive-index regions 2'-1 and 2'-2 to reach the output prism 36. When the power supply to the first electromagnet 29-1 is interrupted by opening the switch 38-1, the guided light beam $L_2$ reaches the output prism 35. If the switch 38-1 is closed to supply the power to the first electromagnet 29-1 and the switch 38-2 is opened to interrupt the power supply to the second electromagnet 29-2, the guided light beam reaches the output prism 37.

In the optical switching circuit of the present embodiment, when $TE_0$ mode guided light beam having a wave length of 0.6328 μm was used, the obtained deflection angle was 22° and the switching speed waas approximately 100 msec. An amount of attenuation between the guided light beam $L_2$ and the transmitted light beam $L_3$ was 0.5 dB. An attenuation amount between the guided light beam $L_2$ and the deflected light beam $L_5$ was 0.2 dB. An attenuation amount between the guided beam $L_2$ and the transmitted light beam $L_6$ was 1.0 dB. Extinction ratios of the output prisms 35, 36 and 37 wwere 20 dB, 12 to 16 dB and 12 dB, respectively.

While in the embodiment shown in FIG. 9, two pressure sections with the respective flexible dielectric thin layers, i.e., the switch sections are disposed on the optical waveguide film 2, the number of switch sections is not limited to two. For example, a single switch section may be disposed on the optical waveguide film 2, or alternatively, a plurality of switch sections may be disposed in the directions of the transmitted light beam and/or deflected light beam and those switch sections may be controlled by an electromagnet or electromagnets. This arrangement may also provide a thin film optical switch which is electrically controlled.

Figure 10:
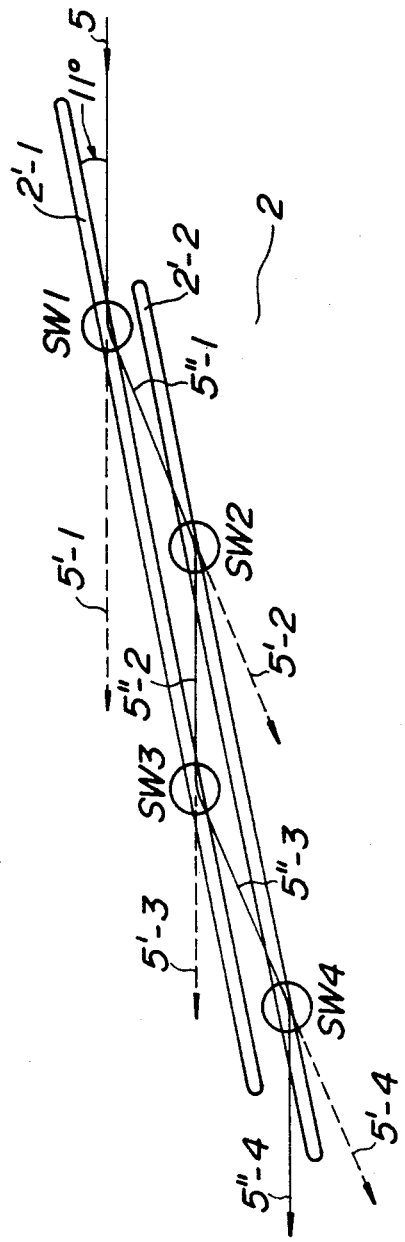
FIG. 10 is a schematic diagram showing an embodiment of a $1 \times 5$ switch using optical switches according to the present invention.

FIG. 10 shows an embodiment of a 1×5 switch array using four optical switches according to the present invention. In this embodiment, a couple of low-refractive-index regions 2'-1 and 2'-2 in the form of stripe are formed on the optical waveguide film 2. The guided light beam 5 is incident to the low-refractive-index region 2'-1 at an incident angle θ, for example, 11°. Optical switches SW1, SW2, SW3 and SW4 are disposed on the optical paths of the incident light 5, successive transmitted light beams 5'-1, 5'-2, 5'-3 and 5'-4 and successive deflected light beams 5''-1, 5''-2, 5''-3 and 5''-4. The optical switch as mentioned above may be used for those switches SW1, SW2, SW3 and SW4 in the present embodiment.

Figure 11:
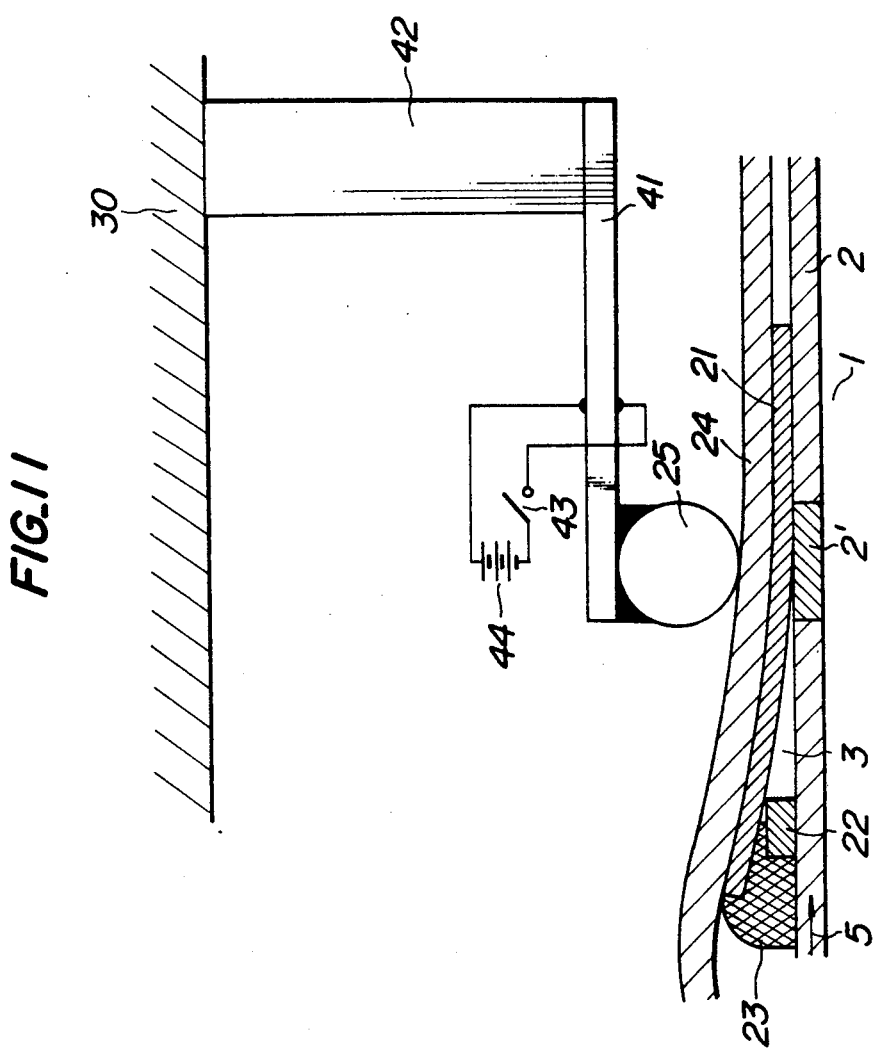

Another embodiment of the present invention using bimorph is shown in FIG. 11. Like portions in FIG. 8 are designated by corresponding reference numerals in FIG. 11. In the present embodiment, a piezo-electric ceramic plate, i.e., a so-called bimorph plate 41, which is made of a solid solution of $PbZrO_3$ and $PbTiO_3$ (PZT), is fixed to a pressing mechanism fixing member 30 through a bimorph supporing means 42. A pressing ball 25 is bonded to the distal end of the bimorph plate 41 so that the ball 25 contacts the protecting sheet 24. When a power source 44 applies a voltage to the bimorph plate 41 through a switch 43, the bimorph plate 41 bends downwardly because of its piezo-electric effect to cause the flexible dielectric thin layer 21 to be depressed against the optical waveguide film 2 and the low-refractive-index region 2'. A movable distance or displacement of the dielectric thin film 21 for switching the guided light beam is 0.2 μm at most, as described above. The 0.2 μm displacement is realized by applying several tens V to the bimorph plate 41. Thus, the depressing mechanism shown in FIG. 11 utilizing the bimorph plate 41 may readily be realized.

Another embodiment of the present invention using a laminated type piezo-electric element is illustrated in FIG. 12. In the present embodiment, a laminated type piezo-electric element 51 containing multilayered piezoelectric ceramic plates made of a solid solution of $PbZrO_3$ is fixed at its upper surface to the depressing mechanism fixing member 30 and bonded at its lower surface to the pressing ball 25. The respective piezo-electric ceramic plates of the piezo-electric element 51 are multilayered in a manner that a voltage from a power source 53 is applied across the respective ceramic plates through a switch 52. The pressing ball 25 may be displaced by 0.2 μm by applying several tens V across the respective ceramic plates.

The electric control means for controlling whether the pressing member is depressed against the protecting sheet as shown in FIGS. 8 to 12, is not limited to the electromagnet, the bimorph plate or the laminated type piezo-electric element, but various types of controlling means may be employed in accordance with purposes. In the embodiment shown in FIG. 11, the bimorph plate 41 may be replaced by a bimetal. In this case, a power supply from the power source 44 to the bimetal is controlled by the switch 43. In response to the downward bending of the bimetal, the dielectric thin film 21 is depressed against the waveguide film 2 and the low-refractive-index region 2'.

As described above, in the embodiments shown in FIGS. 8 to 12, the proper combination of the spacers, the protecting sheet, the pressing mechanism with the pressing ball which is controlled electrically, electrically controls the thin film optical switch. Further, the pressing mechanism with the pressing ball is operable by a small power, so that these embodiments of the present invention are suitable for miniaturizing the device and an integrated fabrication.

As described above, an optical switch according to the present invention provides a larger deflection angle than a conventional optical switch. Accordingly, the optical switches of the invention are used to arrange an optical switch circuit having a plurality of inputs and a plurality of outputs. Before embodiments of such an optical switch circuit are described, a construction of an optical switch used in these embodiments will be given with reference to FIG. 13. In FIG. 13, like reference numerals are used to designate corresponding portions shown in FIG. 1.

In FIG. 13, reference numeral 61 designates a dielectric chip driving section (e.g. a piezo-electric bimorph) mechanically coupled to the movable dielectric chip 4 for vertically driving the dielectric member 4 in the z axis direction. Reference numeral 62 denotes a drive circuit electrically coupled to the dielectric chip driving section 61.

As shown in FIG. 13, when the guided light beams 63 and 63' are incident to the low-refractive-index region 2' in the optical waveguide film 2, those are totally reflected in or transmitted through the low-refractive-index region 2' in accordance with the incident angle θ. The refractive index distribution of the low-refractive-index region 2' may be of step type or graded type. The embodiment shown in FIG. 13 employs the graded type low-refractive-index region 2' having a refractive index distribution which is graded in the y axis direction. The deflection of the light beam takes place at the center of the low-refractive-index region 2'. In the case, the refractive index $n_2'$ is a value obtained at the center in the y axis direction of the low-refractive-index region 2'. Here, the relationship between the distance $l_3$ between the movable dielectric chip 4 and the optical waveguide film 2 shown in FIG. 2, and the total reflection condition in the low-refractive-index region 2' is determined in a manner mentioned above. Accordingly, when the distance $l_3$ is large, that is, when the movable dielectric chip 4 is remote from the waveguide film 2, the total reflection condition is satisfied, so that the incident guided light beam 63 is totally reflected to produce an output guided light beam 64, and the incident guided light beam 63' is also totally reflected to produce an output guided light beam 64'.

On the other hand, when the distance $l_3$ is sufficiently small as mentioned above, that is, when the movable dielectric chip 4 is made close to the wave guide film 2, the total reflection condition is not satisfied, so that the incident guided light beam 63 passes through the low-refractive-index region 2' to produce an output guided light beam 64'. The incident guided light beam 63' also transmits through the region 2' to produce the output guided light beam 64.

Figure 14A:
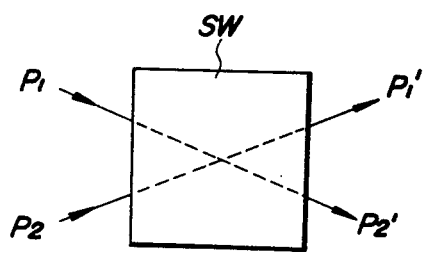
FIGS. 14A and 14B are schematic diagrams illustrating connection states of the $2 \times 2$ switch shown in FIG. 13.
Figure 14B:
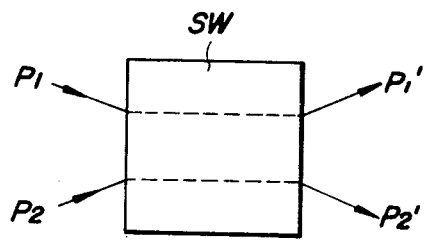

In this case, the branching angle formed between the output guided light beams 64 and 64' is $2\theta$, as seen from FIG. 13. The branching angle $2\theta$ is 20° or more when a specific refraction index difference $(n_2-n_2')/n_2$ is 2% between the low-refractive-index region 2' and the optical waveguide film 2. In order to drive such a switch element, a drive signal is applied from the drive circuit 62 to the dielectric driving section 61 to move the movable dielectric chip 4 upwardly or downwardly in the z axis direction. Such the switch element as mentioned above performs a switching operation as schematically shown in FIGS. 14A and 14B. When the optical switch SW is turned on, i.e., when the movable dielectric chip 4 is made close to the film 2 and the region 2', an input port $P_1$ is coupled to the output port P2', and the input port P2 is coupled to an output port P1', as shown in FIG. 14A. On the other hand, when the optical switch SW is turned off, i.e., when the chip 4 is made remote from the film 2 and the region 2', the input port P1 is coupled to the output port P1' and the input port P2 is coupled to the output port P2' as shown in FIG. 14B. The switch of this type is called a rearrangable blocking type 2×2 switch. Here, the rearrangable type means that any one of the input ports is necessarily coupled to any one of the output ports with one-to-one correspondence. The blocking type means that a connection of one input port to one output port influences the connection of other input ports.

Figure 15:
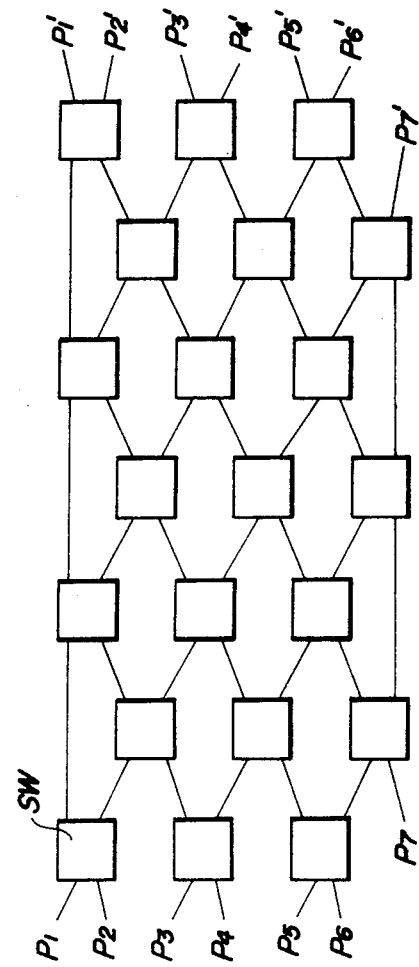
FIGS. 15 and 16 are schematic diagrams showing two embodiments of an $N \times N$ switch circuit according to the present invention.
Figure 16:
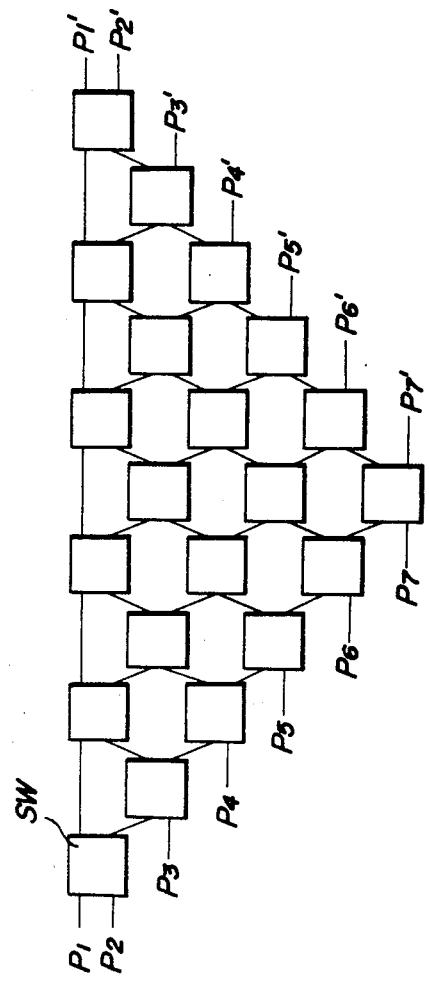

It is known that, if the rearrangeable blocking type 2×2 switch is used as a unit switch, a rearrangable blocking type K×K switch is constructed by K(K−1)/2 2×2 unit switches SW. An arrangement of the K×K switch may be a diamond array as shown in FIG. 15 or a triangle array as shown in FIG. 16. Both of the embodiments of the switches shown in FIGS. 15 and 16 are a 7×7 switch array. The K×K switch array shown in FIG. 15 or FIG. 16 may be arranged by using the 2×2 switch element shown in FIG. 13.

Figure 17:
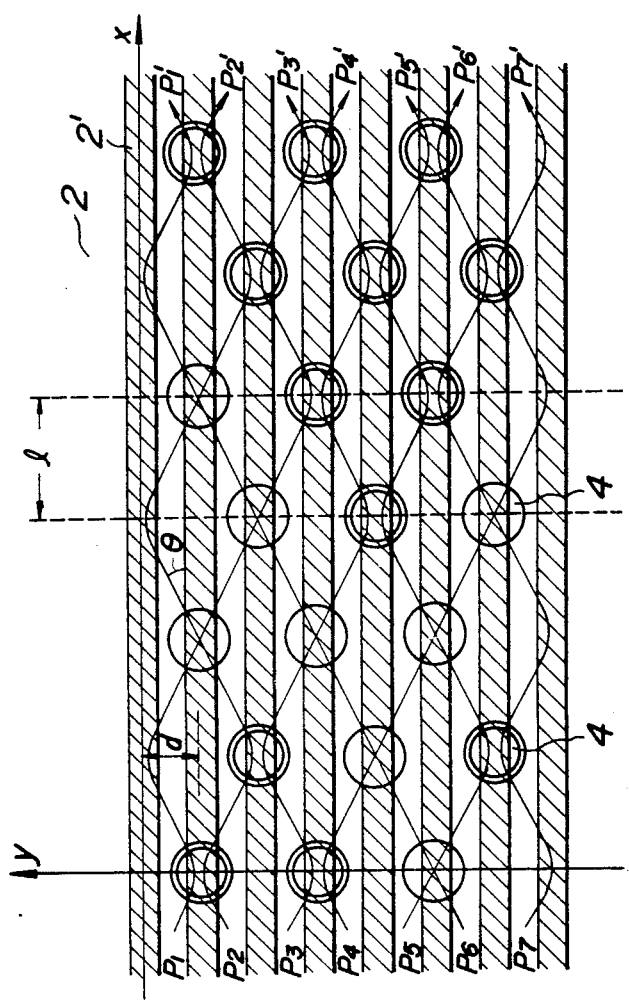
FIGS. 17 and 18 are schematic diagrams showing detailed constructions of an $N \times N$ switch circuit according to the present invention.

FIG. 17 shows a K×K optical switch array of the diamond type shown in FIG. 15. For ease of explanation, an x-y coordinate system is applied to the switch array as shown in FIG. 17. In FIG. 17, (K+1) low-refractive-index regions 2' in the form of stripe are arranged in paralled with one another in the waveguide film 2 in a manner that the respective center lines of the stripe regions 2' coincide with y = −kd (k=0, 1, ..., K) and the left ends of the regions 2' reside in the third quadrant of the x-y coordinate system. Here, d designates a distance between the center lines of adjacent two low-refractive-index regions 2', as shown in FIG. 17. It is assumed that l denotes a distance in the x axis direction between a port on a low-refractive-index region 2' and a port which lies in a low-refractive-index region 2' adjacent to the former region 2' and is disposed at the shortest distance from the former port, and that when the x coordinates of the (K+1) low-refractive-index regions 2' are represented by l=d/tan θ (θ satisfied equation (2)), the right ends of the regions 2' must be sufficiently larger than (K−1)l.

The movable dielectric chips 4 each having a bottom area sufficiently broad to cover the low-refractive-index region 2' and the vicinal area of the waveguide film 2 in the vicinity of the region 2' are provided via the intermediate layer 3 above the low-refractive-index region 2' and the vicinal areas at K(K−1)/2 positions which are represented by the coordinates $$[2(k_1-1)l, 2(k_2-1)d],$$

wherein when K is an odd number, $$k_1 = 1, 2, \ldots, (K+1)/2$$

$$k_2 = 1, 2, \ldots, (K-1)/2$$

when k is an even number,
$$k_1 = 1, 2, \ldots, k/2$$

$$k_2 = 1, 2, \ldots, K/2$$

and by the coordinates $$[(2k_1-1)l, 2k_2d],$$

wherein when K is an odd number, $$K_1 = 1, 2, \ldots, (K-1)/2$$

$$k_2 = 1, 2, \ldots, (K-1)/2$$

when K is an even number,
$$k_1 = 1, 2, \ldots, K/2$$

$$k_2 = 1, 2, \ldots, K/2-1.$$

This arrangement forms a 7×7 rearrangable blocking type thin film optical switch circuit having output ports P1' to P7' for the guided light beam incident to input ports P1 to P7 in the case of FIG. 17. Here, the input and output ports P1, P2, . . . and P1', P2', . . . are numbered in sequence from the port the closest to the x axis. FIG. 17 illustrates an connection arrangement of the ports P1-P3', P2-P2', P3-P4', P4-P7', P5-P5', P6-P1' and P7-P6'. In the figure, the switch elements enclosed with a single circle indicate that those are in ON state and the switch elements enclosed with a double circle indicate that those are in OFF state. The connection of the connection pair Pa and Pa' (Pa indicates P1, P2, . . . , P7 and Pa' indicates P1', P2', . . . , P7') is made in the order from a pair having the largest "|a−a'|", since the larger the "|a−a'|" of the connection, the narrower the selection of optical paths.

Figure 18:
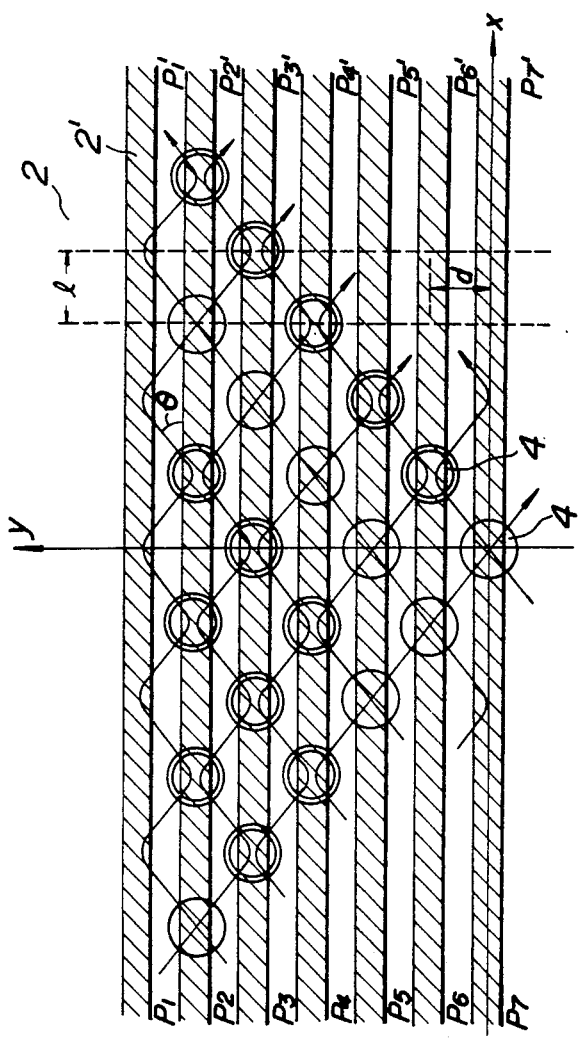

FIG. 18 shows an arrangement of a K×K rearrangable blocking type thin film optical switch having the triangle structure shown in FIG. 16. In the arrangement, the K low-refractive-index regions 2' in the form of stripe are disposed in the optical waveguide film 2 in such a way that the respective center lines of the regions 2' are coincident with y=kd (k=0, . . . , K−1), and that the x coordinates of the right ends are larger than (k−1)l and x coordinates of the left ends is smaller than −(k−b 1)l. The movable dielectric chips 4 each having a bottom area broad enough to cover the low-refractive-index region 2' and a vicinal area of the waveguide film 2 in the vicinity of the region 2' are provided via the intermediate layer 3 above the low-refractive-index regions 2' and the vicinal areas at K(K−1)/2 positions which are represented by the co-ordinates $$[(k_1-1)l-2l(k_2-1), (k_1-1)d]$$

where $$k_1 = 1, 2, \ldots, K-1$$

$$k_2 = 1, 2, \ldots, k_1.$$

This arrangement may also form the 7×7 rearrangable blocking type thin film switch circuit having output ports P1' to P7' for input ports P1 to P7. The input and output ports P1, P2, . . . and P1', P2', . . . are numbered in sequence from the port the farthest from the x axis. Like FIG. 17, FIG. 18 shows a connection arrangement of P1-P3', P2-P2', P3-P4', P4-P7', P5-P5', P6-P1' and P7-P6'. The connection of the port pairs are made in the order from the input or output port having the largest number to that having the smallest number, since the larger the input or output port number of the connection, the more limited the selection of the optical path.

While the embodiments shown in FIGS. 17 and 18 are the 7×7 optical switch arrays, a k×k rearrangable blocking type switch may be arranged in a manner described above according to the present invention.

As described above, a thin film optical switch circuit using an optical switch according to the present invention has a structure that the movable dielectric chips are provided above the K low-refractive-index regions arranged in parallel with each other which is readily formed in the waveguide film. Therefore, the construction of the optical switch is simple and the K×K switch circuit may be fabricated on a single substrate. Additionally, the deflection angle of a basic switch element constituting the switch circuit is large, so that the circuit density of switch arrangement is greatly improved.

As a consequence, if a thin film optical switch circuit using a plurality of optical switches according to the invention is advantageously applied to optical communication and optical data processing fields, the manufacturing cost and the size of the device are reduced effectively.

As described above, an optical switch according to the present invention has a large deflection angle in the order of about 20°. In this respect, the deflection performance of the optical switch is remarkably improved compared to a conventional switch. Therefore, an optical switch of the invention does not require a long waveguide and accordingly is suitable for integration. In addition, the simple construction of the optical switch ensures a stable operation. The optical switch can be fabricated without process step requiring a high skill and thus the fabrication of the optical switch is easy. As a result and since peripheral devices are not required, a manufacturing cost of the optical switch is inexpensive. The electrical control of a distance between the flexible dielectric thin layer and the waveguide film enables the electrical switching of the deflecting direction and greatly contributes to reduce the size of the switch device. Further, the K×K optical switch circuit may be integrated on a single substrate with a high integration density. Thus, an optical switch of the present invention is very useful in the technical field of optical communication, optical data processing or the like.

What is claimed is:

1. An optical switch comprising:
   a substrate with a refractive index $n_1$ which is transparent with respect to a guided light beam;
   an optical waveguide film with a refractive index $n_2$ which is formed on said substrate;
   a low-refractive-index region with a refractive index $n_2'$ which is smaller by a predetermined value than said refractive index $n_2$ formed at a predetermined location in said optical waveguide film;
   a movable dielectric chip with a refractive index $n_4$ which is transparent with respect to said guided light beam and a relative distance of which is adjustable relative to a plane including said low-refractive-index region and a vicinal area of said optical waveguide film in the vicinity of said low-refractive-index region; and
   an intermediate layer with a refractive index $n_3$ which is disposed between said plane and said movable dielectric chip,
   wherein said refractive indices $n_1$, $n_2$, $n_2'$, $n_3$ and $n_4$ have a relationship of $n_2 > n_2' > n_4 > (n_1, n_3)$, and effective refractive indices of said optical waveguide film and said low-refractive-index region are varied by changing a distance between said plane and said movable dielectric chip, so that the guided light beam incident to said low-refractive-index region is deflected.

2. An optical switch as claimed in claim 1, wherein said movable dielectric chip is movable in a direction vertical or horizontal with respect to said plane.

3. An optical switch as claimed in claim 1, wherein said movable dielectric chip is displaceable in a direction in parallel with said plane.

4. An optical switch as claimed in claim 1, wherein said movable dielectric chip is cylindrical.

5. An optical switch as claimed in claim 1, wherein a pointed edge is formed at the end portion of said movable dielectric chip facing said plane.

6. An optical switch as claimed in claim 1, wherein said optical waveguide film is an $SiO_2$-$Ta_2O_5$ film.

7. An optical switch as claimed in claim 6, wherein said substrate is made of Vycor glass.

8. An optical switch as claimed in claim 7, wherein said dielectric chip is made of gadolinium gallium garnet.

9. An optical switch as claimed in claim 1, wherein said intermediate layer is an air layer.

10. An optical switch as claimed in claim 1, wherein said movable dielectric chip is a flexible dielectric thin layer disposed above said plane via said intermediate layer, and a drive member movable in a direction vertical to said plane is disposed above said flexible dielectric thin layer, wherein effective refractive indices of said optical waveguide film and said low-refractive-index region are varied by changing a distance between said plane and said flexible dielectric thin layer by means of said drive member, so that said guided light beam incident into said low-refractive-index region is deflected.

11. An optical switch as claimed in claim 10, wherein a protecting layer is deposited on a surface of said flexible dielectric thin layer facing said drive member.

12. An optical switch as claimed in claim 11, wherein said intermediate layer is defined by a spacer interposed between said optical waveguide film and said flexible dielectric thin layer.

13. An optical switch comprising: a substrate with a refractive index $n_1$ which is transparent with respect to a guided light beam; an optical waveguide film with a refractive index $n_2$ which is formed on said substrate; and at least one switching portion disposed on said waveguide film and having
   a low-refractive-index region with a refractive index $n_2'$ which is smaller by a predetermined value than said refractive index $n_2$ formed at a predetermined location in said optical waveguide film;
   a movable dielectric thin layer with a refractive index $n_4$ which is transparent with respect to said guided light beam and has an area sufficiently broad to cover said low-refractive-index region and a vicinal area of said optical waveguide film in the vicinity of said low-refractive-index region;
   an air layer with a refractive index $n_3$ formed by fixing one end of said flexible dielectric thin layer via a spacer to a location of said optical waveguide film which is off a propagating path of said guided light beam so as to keep a predetermined distance between said flexible dielectric thin layer and a plane including said low-refractive-index region and said vicinal area of said waveguide film;
   a protecting sheet covering said flexible dielectric thin layer;
   a pressing member disposed on said protecting sheet for pressing said protecting sheet against said flexible dielectric thin layer to change a distance between said flexible dielectric thin layer and said low-refractive-index region; and
   electrical control means for controlling whether said pressing member is to be pressed against said protecting sheet or not, wherein said refractive indices $n_1$, $n_2$, $n_2'$, $n_3$ and $n_4$ have a relationship of $n_2 > n_2' > n_4 > (n_1, n_3)$ and the propagating direction of said guided light beam is switched in a manner that said guided light beam incident to said switching portion propagates straight or deflected by a predetermined angle under the control of said electrical control means.

14. An optical switch as claimed in claim 13, wherein said pressing member has a pressing ball which is pressed against said protecting sheet under the control of said electrical control means.

15. An optical switch as claimed in claim 14, wherein said electrical control means is an electromagnet.

16. An optical switch as claimed in claim 14, wherein said electric control means is a piezo-electric bimorph.

17. An optical switch as claimed in claim 13, wherein said low-refractive-index regions in said switch portions are stripe-shaped and arranged in parallel with each other.

18. An optical switch circuit comprising:
   a substrate with a refractive index $n_1$ which is transparent with respect to said guided light beam;
   an optical waveguide film with a refractive index $n_2$ which is formed on said substrate;
   a low-refractive-index region with a refractive index $n_2'$ which is smaller by a predetermined value than said refractive index $n_2$ and formed at a predetermined location in said optical waveguide film in which said low-refractive-index region is comprised of $(K+1)$ (where K: posotive integer) stripe regions and in which, when an x-y orthogonal coordinate system is applied to said optical waveguide film, the center lines of said respective stripe regions are coincident with $(K+1)$ straight lines expressed by $y = -kd$, where $k = 0, 1, \ldots, K$ and $d$ = a distance between the center lines of the adjacent stripe regions, the leftmost side of each of said stripe regions lying in a third quadrant of said x-y orthogonal coordinate system, a total reflection angle $\theta$ of said low-refractive-index region with respect to said guided light beam and a distance l in the direction of x axis between a first port of one stripe region and a second port of a stripe region adjacent to said one stripe region, and said second port being the closest to said first port having a relationship of $l=d/\tan \theta$, and an x coordinate of each of the rightmost sides of said $(K+1)$ stripe regions being larger than $(K-1)l$; and movable dielectric chips with a refractive index $n_4$ and each having a bottom surface which is sufficiently broad to cover said stripe region and a vicinal area of said optical waveguide film in the vicinity of said stripe region and which is in parallel with said optical waveguide film and disposed on an intermediate layer with a refractive index $n_3$ at each of K $(K-1)/2$ locations which are represented by the following coordinates of x-y coordinate system on the low-refractive-index region;

$$[2(k_1-1)l, 2(k_2-1)d]$$

where, when K is an odd number, $$k_1 = 1, 2, \ldots, (K+1)/2$$

$$k_2 = 1, 2, \ldots, (K-1)/2$$

when K is an even number, $$k_1 = 1, 2, \ldots, K/2$$

$$k_2 = 1, 2, \ldots, K/2, \text{ and}$$

$$[(2k_1-1)l, 2k_2d]$$

where, when K is an odd number, $$k_1 = 1, 2, \ldots, (K-1)/2$$

$$k_2 = 1, 2, \ldots, (K-1)/2$$

when K is an even number, $$k_1 = 1, 2, \ldots, K/2$$

$$k_2 = 1, 2, \ldots, (K/2)-1$$

wherein relationships of $N'/N > \cos \theta > N_0'/N_0$ and $n_2 > n_2' > n_4 > (n_1, n_3)$ are satisfied, where $N_0$ and $N_0'$ are effective refractive indices of said optical waveguide film and the center of said stripe region, respectively, when a distance $l_3$ between said movable dielectric chip and said optical waveguide film is larger than the thickness of said optical waveguide film, and N and N' are effective refractive indices of said waveguide film and the center of said stripe regions, respectively.

19. An optical switch comprising:

a substrate with a refractive index $n_1$ which is transparent with respect to said guided light beam;

an optical waveguide film with a refractive index $n_2$ which is formed on said substrate;

a low refractive index region with a refractive index $n_2'$ which is smaller by a predetermined value than said refractive index $n_2$ and formed at a predetermined location in said optical waveguide film in which said low-refractive-index region is comprised of K (where K: positive integer) stripe regions and in which, when an x-y orthogonal coordinate system is applied to said optical waveguide film, the center lines of said respective stripe regions are coincident with K straight lines expressed by $y = -kd$, where $k = 0, 1, \ldots, K-1$ and $d =$ a distance between the center line of the adjacent stripe regions, and the leftmost side of each of said stripe regions lying in a third quadrant of said x-y orthogonal coordinate system, a total reflection angle $\theta$ of said low-refractive-index region with respect to said guided light beam and a distance l in the direction of x axis between a first port of one stripe region and a second port of a stripe region adjacent to said one stripe region, and said second port being the closest to said first port having a relationship of $l=d/\tan \theta$, and an x coordinates of each of the right most sides of said K stripe regions being larger than $(K=1)l$; and movable dielectric chips with a refractive index $n_4$ and each having a bottom surface, which is sufficiently broad to cover said stripe region and a vicinal area of said optical waveguide film in the vicinity of said stripe region and which is in parallel with said optical waveguide film and disposed on an intermediate layer with a refractive index $n_3$ at each of $K(K-1)/2$ locations which are represented by the following coordinates of x-y orthogonal coordinate system on said low-refractive-index region;

$$[(k_1-1)l - 2l(k_2-1), (k_1-1)d]$$

where $$k_1 = 1, 2, \ldots, K/2$$

$$k_2 = 1, 2, \ldots, k_1$$

wherein relationships of $N'/N > \cos \theta > N_0'/N_0$ and $n_2 > n_2' > n_4 > (n_1, n_3)$ are satisfied, where $N_0$ and $N_0'$ are effective refractive indices of said optical waveguide film and the center of said stripe region, respectively, when a distance $l_3$ between said movable dielectric chip and said optical waveguide film is larger than the thickness of said optical waveguide film, and N and N' are effective refractive indices of said waveguide film and the center of said stripe region, respectively.

* * * * *